(12) United States Patent
Sandou et al.

(10) Patent No.: US 9,631,532 B2
(45) Date of Patent: Apr. 25, 2017

(54) ENGINE DEVICE OF WORKING VEHICLE

(71) Applicant: YANMAR CO., LTD., Osaka (JP)

(72) Inventors: Yoshiyuki Sandou, Osaka (JP);
Tomoyuki Kimura, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/771,680

(22) PCT Filed: Mar. 13, 2014

(86) PCT No.: PCT/JP2014/056609
§ 371 (c)(1),
(2) Date: Aug. 31, 2015

(87) PCT Pub. No.: WO2014/142222
PCT Pub. Date: Sep. 18, 2014

(65) Prior Publication Data
US 2016/0010525 A1    Jan. 14, 2016

(30) Foreign Application Priority Data

Mar. 15, 2013    (JP) .................................. 2013-053379

(51) Int. Cl.
*F01N 3/035*    (2006.01)
*A01D 41/12*    (2006.01)
(Continued)

(52) U.S. Cl.
CPC ............. *F01N 3/035* (2013.01); *A01D 41/12* (2013.01); *F01N 3/106* (2013.01); *F01N 3/2066* (2013.01);
(Continued)

(58) Field of Classification Search
CPC ...... F02D 41/029; F01N 9/002; F01N 3/0842; F01N 13/02; F01N 3/035
(Continued)

(56) References Cited

U.S. PATENT DOCUMENTS

| 8,979,125 | B2 | 3/2015 | Sato et al. |
| 2010/0196219 | A1 | 8/2010 | Endo et al. |

(Continued)

FOREIGN PATENT DOCUMENTS

| JP | 2009-074420 | 4/2009 |
| JP | 2010-051216 | 3/2010 |

(Continued)

OTHER PUBLICATIONS

Machine Translation of JP 2010051216, Translated on Jun. 16, 2016.*

(Continued)

*Primary Examiner* — Patrick Maines
(74) *Attorney, Agent, or Firm* — Norris McLaughlin & Marcus, P.A.

(57) ABSTRACT

Provided is an engine device of a working vehicle structured such that a first case and a second case can be firmly fixed with a high rigidly by sharing supporting loads of the first case and the second case by an engine room and a working portion. In the engine device of the working vehicle having the first case which removes particulate matter in exhaust gas of an engine, and the second case which removes nitrogen oxide in the exhaust gas of the engine, the first case is provided in an outer side of the engine room which is inward provided with the engine via a first case support body, and the second case is provided in the working portion which is adjacent to the engine room via a second case support body.

3 Claims, 16 Drawing Sheets

(51) Int. Cl.
*F01N 3/10* (2006.01)
*F01N 3/20* (2006.01)
*F01N 13/00* (2010.01)

(52) U.S. Cl.
CPC ........ *F01N 13/009* (2014.06); *F01N 2330/08* (2013.01); *F01N 2340/04* (2013.01); *F01N 2590/08* (2013.01); *Y02T 10/24* (2013.01)

(58) Field of Classification Search
USPC .................................. 60/295, 301, 299, 311
See application file for complete search history.

(56) References Cited

U.S. PATENT DOCUMENTS

| | | | |
|---|---|---|---|
| 2013/0343853 A1 | 12/2013 | Sato et al. | |
| 2015/0306950 A1* | 10/2015 | Sandou | E02F 9/0866 60/297 |
| 2016/0010525 A1* | 1/2016 | Sandou | A01D 41/12 60/301 |
| 2016/0024752 A1* | 1/2016 | Mitsuda | E02F 9/0866 180/296 |
| 2016/0040568 A1* | 2/2016 | Sandou | F01N 3/2066 180/309 |
| 2016/0053645 A1* | 2/2016 | Sandou | F01N 3/2066 60/301 |
| 2016/0082830 A1* | 3/2016 | Okamura | F01N 3/2066 180/309 |

FOREIGN PATENT DOCUMENTS

| | | | |
|---|---|---|---|
| JP | 2010-051239 | | 3/2010 |
| JP | 2010051216 A | * | 3/2010 |
| JP | 2010-083331 | | 4/2010 |
| JP | 2010-209813 | | 9/2010 |
| JP | 2010216336 A | * | 9/2010 |
| JP | 2012-021505 | | 2/2012 |
| JP | 2012-177233 | | 9/2012 |
| JP | 2012-219624 | | 11/2012 |
| JP | 2012-219625 A | | 11/2012 |
| JP | 2012219624 A | * | 11/2012 |

OTHER PUBLICATIONS

Machine Translation of JP 2012219624, Translated on Jun. 16, 2016.*

* cited by examiner

ENGINE DEVICE OF WORKING VEHICLE

TECHNICAL FIELD

The present invention relates to an engine device of a working vehicle such as a combine harvester which reaps grain straws planted on a farm field and collects grains, or a feeding stuff combine harvester which reaps grain straws for feeding stuff and collects the grain straws for the feeding stuff, and more particularly to an engine device of a working vehicle provided with an exhaust gas purification device which removes particulate matter (soot and particulate) included in exhaust gas of a diesel engine, or nitrogen oxide (NOx) included in the exhaust gas.

BACKGROUND OF THE INVENTION

Conventionally, there has been known a technique of purifying exhaust gas discharged from a diesel engine by setting in an exhaust passage of a diesel engine a case (hereinafter, refer to as DPF case) which is inward provided with a diesel particulate filter, and a case (hereinafter, refer to as SCR case) which is inward provided with an urea selective reduction type catalyst, as an exhaust gas purification device (an exhaust gas post-treatment device), and introducing exhaust gas to the DPF case and the SCR case (refer, for example, to Patent Documents 1 to 3). Further, a combine harvester has been conventionally structured such as to cut unreaped grain straws in a farm field by a reaping blade device, convey and thresh the reaped grain straws to a threshing device by a grain straw conveyance device, and collect the grains in a cereal grain tank, and is structured such that an engine is mounted to a travel machine body, the DPF case is arranged in a transversely directing posture on an upper surface side of the engine, and the exhaust gas is discharged from the engine toward the DPF case (refer, for example, to Patent Document 4).

CITATION LIST

Patent Document 1: Japanese Unexamined Patent Publication No. 2009-74420
Patent Document 2: Japanese Unexamined Patent Publication No. 2012-21505
Patent Document 3: Japanese Unexamined Patent Publication No. 2012-177233
Patent Document 4: Japanese Unexamined Patent Publication No. 2010-209813

SUMMARY OF THE INVENTION

In the case that, the DPF case and the SCR case are assembled while being spaced form the engine, as in the Patent Document 1 or 2, a temperature of the exhaust gas supplied from the engine to the DPF case or the SCR case decreases, and regeneration of a diesel particulate filter or a chemical reaction such as a selective catalyst reduction action tends to become incomplete. As a result, there is a problem of necessity of a specific device for maintaining the temperature of the exhaust gas within the SCR case at a high temperature.

In the case that the DPF case and the SCR case are assembled in the engine as in the Patent Document 3 or 4, the temperature of the exhaust gas within the SCR case can be easily maintained at a high temperature by suppressing the temperature reduction of the exhaust gas supplied from the engine to the SCR case. However, it is necessary to secure an installation space for the DPF case and the SCR case within an engine room, and there is a problem that the DPF case or the SCR, case cannot be easily supported as well as the engine room is hard to be structured compact. Further, in a narrow engine room, there is a problem that it is impossible to improve an assembling workability or a maintenance workability of the DPF case or the SCR case.

Consequently, the present invention aims at providing an engine device of a working vehicle to which an improvement is applied by making a study of the actual condition.

In order to achieve the object mentioned above, an engine device of a working vehicle according to a first aspect of the invention is an engine device of a working vehicle having a first case which removes particulate matter in exhaust gas of an engine, and a second case which removes nitrogen oxide in the exhaust gas of the engine, wherein the first case is provided in an outer side of an engine room which is inward provided with the engine, via a first case support body, and the second case is provided in a working portion which is adjacent to the engine room, via a second case support body.

Further, the invention according to a second aspect of the invention is the engine device of the working vehicle described in the first aspect, wherein the first case is supported vertically, and the second case is supported transversely.

The invention described in a third aspect of the invention is the engine device of the working vehicle described in the first aspect, wherein an exhaust gas inlet of the second case is connected to an exhaust gas outlet of the first case via an urea mixing pipe, a tail pipe is connected to an exhaust gas outlet of the second case, and the urea mixing pipe, the second case and the tail pipe are connected approximately linearly.

The invention described in a fourth aspect of the invention is the engine device of the working vehicle described in the first aspect, wherein a cereal grain tank is arranged in adjacent to a threshing device, a driver cabin is arranged in a forward side of the cereal grain tank, the engine is arranged below the driver cabin, the first case is provided vertically between a front face of the cereal grain tank and a back face of the driver cabin, and the second case is provided transversely in one side upper face of the threshing device which is adjacent to the cereal grain tank.

On the basis of the invention according to the first aspect of the invention, in the engine device of the working vehicle having the first case which removes the particulate matter in the exhaust gas of the engine, and the second case which removes the nitrogen oxide in the exhaust gas of the engine, the first case is provided in the outer side of the engine room which is inward provided with the engine, via the first case support body, and the second case is provided in the working portion which is adjacent to the engine room, via the second case support body. As a result, a load of the first case is borne by the frame of the engine room, and a load of the second case can be borne by the frame of the working portion, so that the load for supporting the first case and the second case can be shared by the engine room or the working portion, and it is possible to firmly fix the first case and the second case with a high rigidity. For example, in the combine harvester, the first case can be compactly assembled vertically between the front face of the cereal grain tank and the back face of the driver cabin, and the second case can be assembled in the upper face of one side of the threshing device with a simple supporting structure.

On the basis of the invention according to the second aspect of the invention, the first case is supported vertically, and the second case is supported transversely. As a result, the second case and the tail pipe connected to the second case can be easily arranged in the upper face side of the working portion (for example, the upper face of one side of the threshing device which is adjacent to the cereal grain tank) while the first case can be easily installed in a narrow space (for example, between the front face of the cereal grain tank and the back face of the driver cabin). Therefore, it is possible to improve an assembling workability or a maintenance workability of the first case or the second case. Further, the vertically arranged first case and the transversely arranged second case can be connected by an L-shaped connection path, the L-shaped connection path can be easily formed by the urea mixing pipe, and an urea mixing structure for jetting the urea water into the exhaust gas leading to the second case can be easily structured.

On the basis of the invention according to the third aspect of the invention, the exhaust gas inlet of the second case is connected to the exhaust gas outlet of the first case via the urea mixing pipe, the tail pipe is connected to the exhaust gas outlet of the second case, and the urea mixing pipe, the second case and the tail pipe are connected approximately linearly. As a result, it is possible to improve an assembling workability and a maintenance workability of the urea mixing pipe, the second case and the tail pipe, while the urea mixing pipe, the second case and the tail pipe can be compactly arranged along a corner portion of one side in the upper face side of the working portion.

On the basis of the invention according to the fourth aspect of the invention, the cereal grain tank is arranged in adjacent to the threshing device, the driver cabin is arranged in the forward side of the cereal grain tank, the engine is arranged below the driver cabin, the first case is provided vertically between the front face of the cereal grain tank and the back face of the driver cabin, and the second case is provided transversely in one side upper face of the threshing device which is adjacent to the cereal grain tank. As a result, the second case, and the tail pipe connected to the second case can be compactly arranged along the upper face of one side of the threshing device which is adjacent to the cereal grain tank, while the first case can be easily installed in the narrow space between the front face of the cereal grain tank and the back face of the driver cabin. Therefore, it is possible to improve an assembling workability or a maintenance workability of the first case or the second case.

DESCRIPTION OF THE PREFERRED EMBODIMENTS

Figure 1:
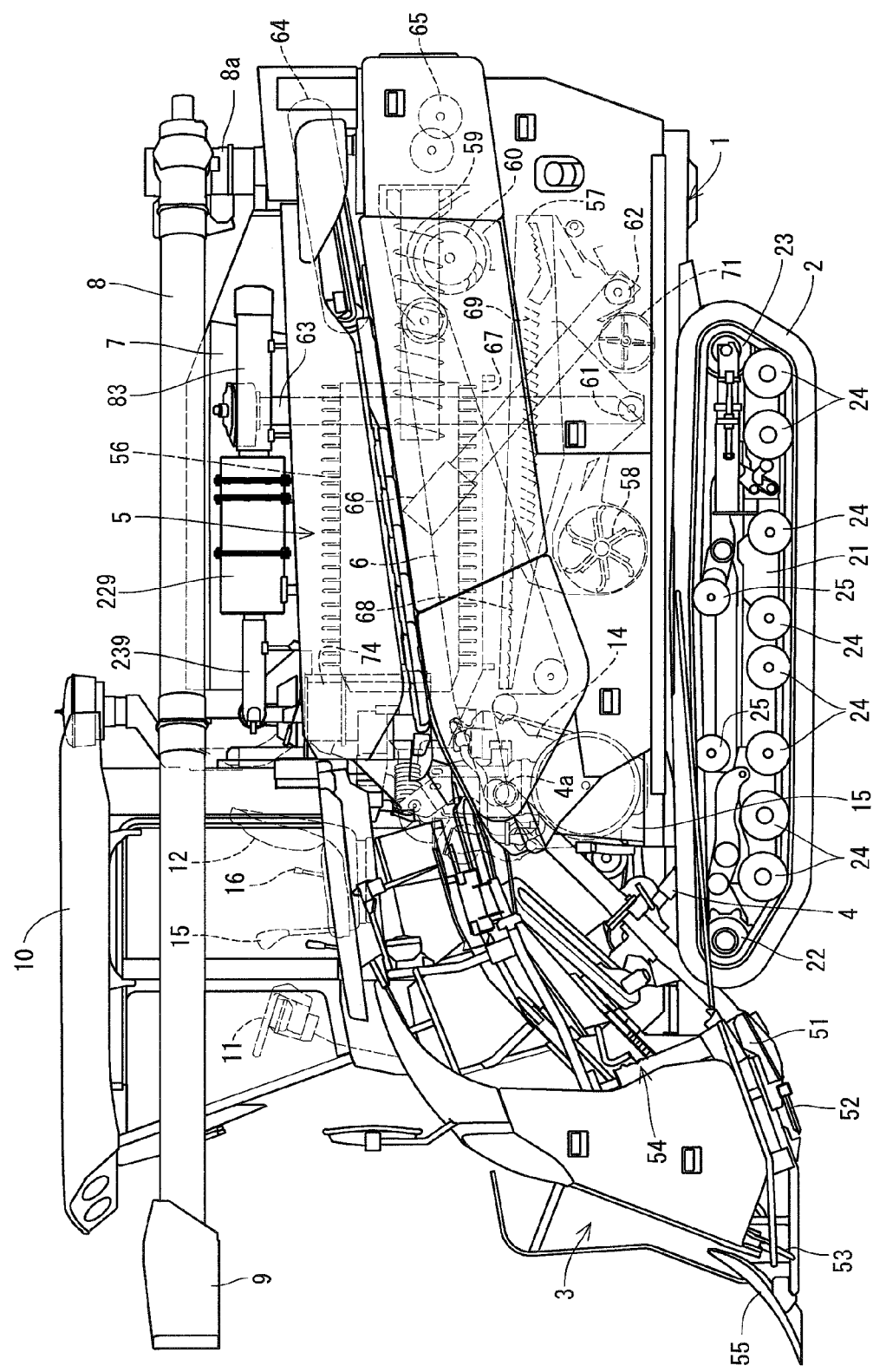
FIG. 1 is a left side elevational view of a combine harvester for six row reaping of a first embodiment of the present invention.
Figure 2:
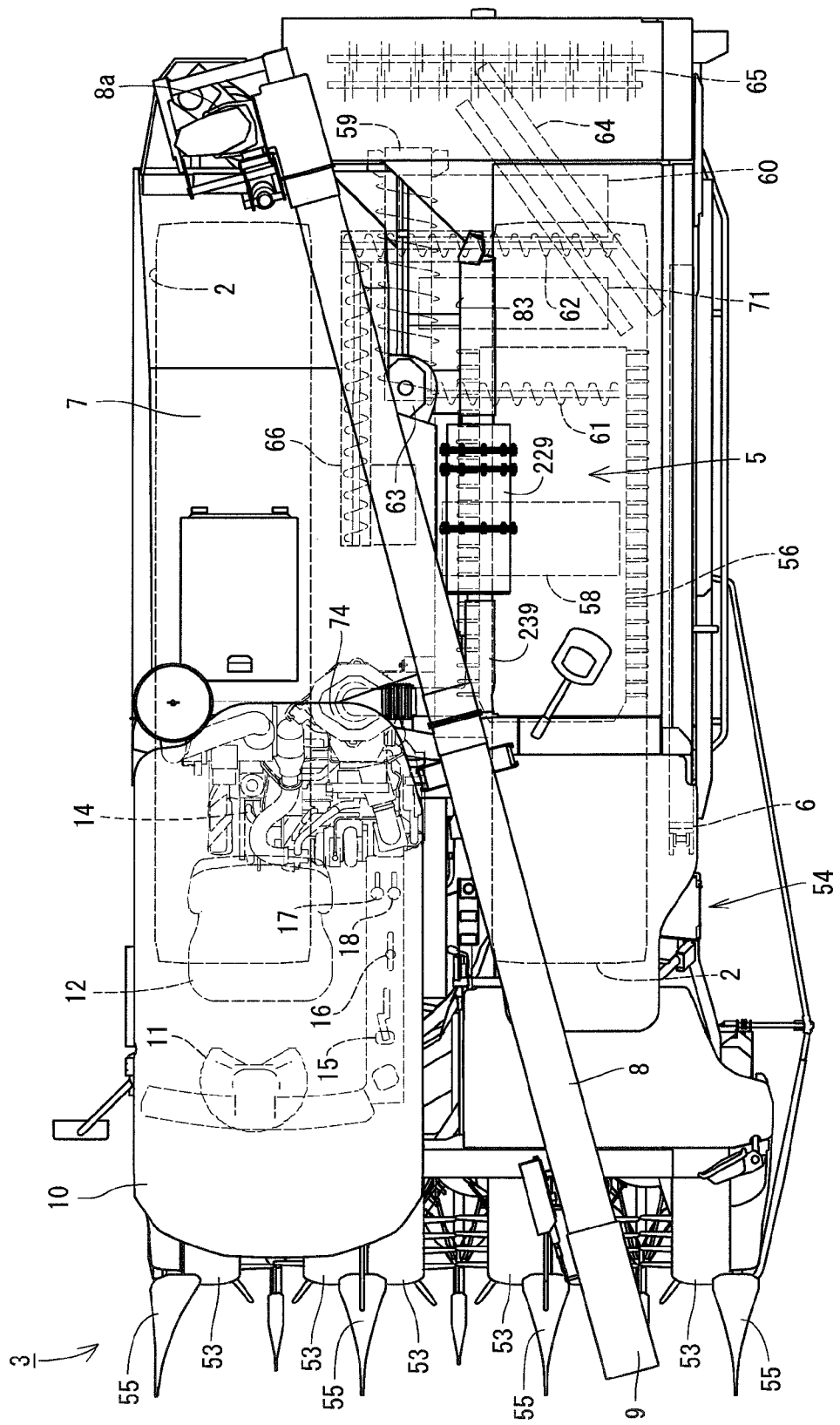
FIG. 2 is a plan view of the same.
Figure 3:
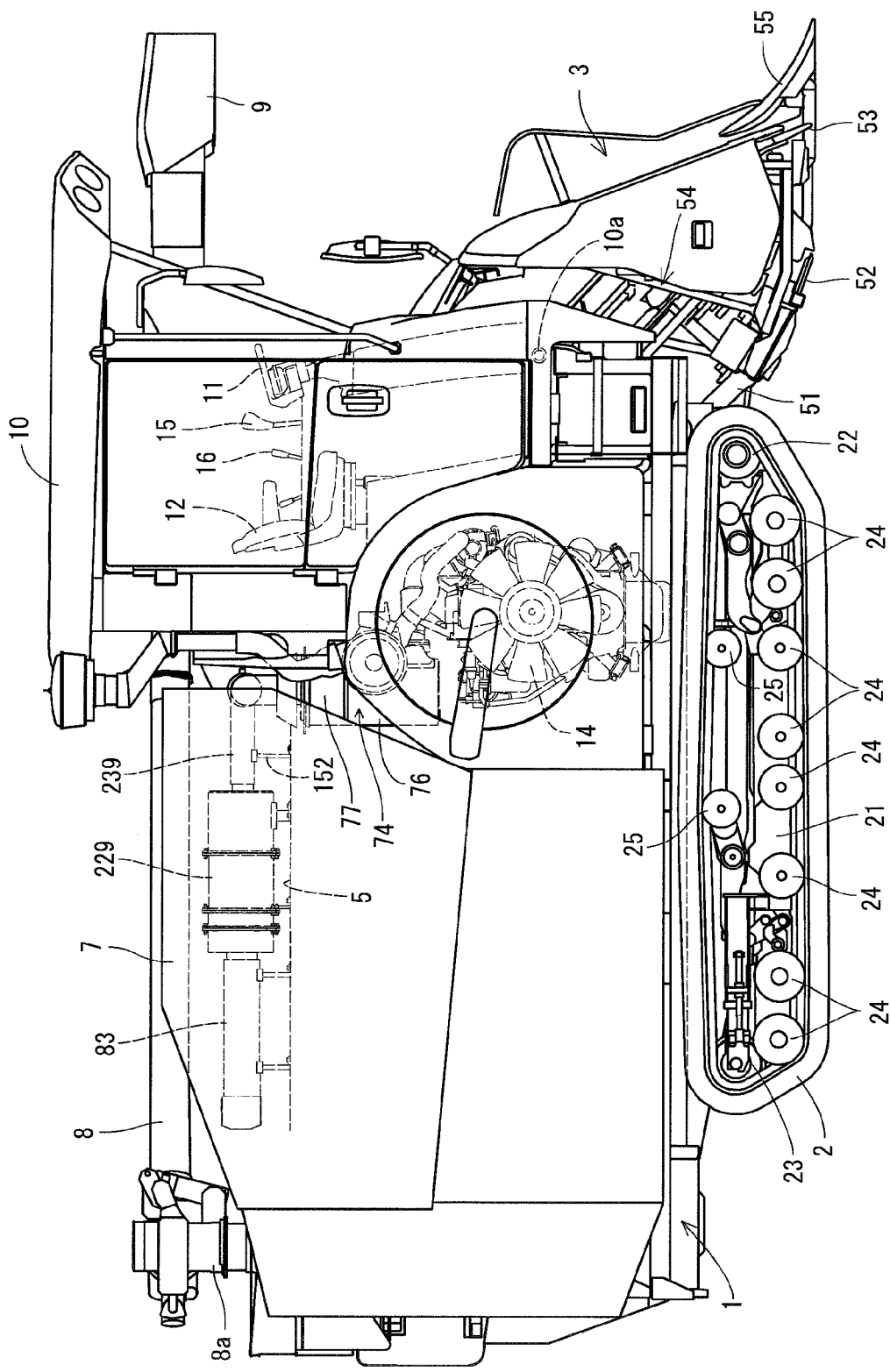
FIG. 3 is a right side elevational view of the same.

A description will be given below of a first embodiment obtained by embodying the present invention with reference to FIGS. 1 to 16. A description will be given of an overall structure of a combine harvester according to the first embodiment to which a diesel engine is mounted, with reference to FIGS. 1 to 3. In the following description, a left side as facing a forward moving direction of a travel machine body 1 is simply called as a left side, and a right side as facing the forward moving direction is simply called as a right side in the same manner. As shown in FIGS. 1 to 3, the travel machine body 1 supported by a pair of right and left traveling crawlers 2 is provided as the traveling portion. A reaping device 3 for six row reaping is installed to a front portion of the travel machine body 1 so as to be adjustable its elevation around a reaping rotation supporting point shaft 4a by a single acting type elevating hydraulic cylinder 4, the reaping device 3 taking in grain straws while reaping. A threshing device 5 and a cereal grain tank 7 are mounted in a horizontally arranged manner, the threshing device 5 having a feed chain 6, and the cereal grain tank 7 storing grains taken out of the threshing device 5. The threshing device 5 is arranged in a left side of the travel machine body 1, and the cereal grain tank 7 is arranged in a right side of the travel machine body 1.

Further, a rear portion of the travel machine body 1 is provided with a cereal grain discharge conveyor 8 which can swivel via a vertically take-out conveyor 8a, and the cereal grain discharge conveyor 8 is structured such that the grains in the cereal grain tank 7 are discharged out of an unhulled rice throwing port 9 of the cereal grain discharge conveyor 8 to a bed of a truck, a container or the like. A driver cabin 10 is provided in a front lateral side of the cereal grain tank 7 in a right lateral side of the reaping device 3. A cabin turning motion supporting point shaft 10a is provided in a lower portion of a front face of the driver cabin 10, the lower portion of the front face of the driver cabin 10 is axially supported rotatably to the travel machine body 1 via the cabin turning motion supporting point shaft 10a, the driver cabin 10 is installed so as to be movable toward an external front lateral side, and the driver cabin 10 is turned forward around the cabin turning motion supporting point shaft 10a.

Within the driver cabin 10, there are arranged a control steering wheel 11, a driver seat 12, a main transmission lever 15, a sub transmission lever 16, a threshing clutch lever 17 which operates the threshing clutch to turn on and off, and a reaping clutch lever 18 which operates the reaping clutch to turn on and off. A diesel engine 14 as a power source is arranged in the travel machine body 1 below the driver seat 12. In the driver cabin 10, there are arranged a step on which an operator gets, a steering wheel column which is provided with the control steering wheel 11, and a lever column which is provided with the levers 15, 16, 17 and 18.

As shown in FIG. 1, right and left truck frames 21 are arranged in a lower surface side of the travel machine body 1. The truck frame 21 is provided with a drive sprocket 22 which transmits power of the engine 14 to the traveling crawler 2, a tension roller 23 which maintains tension of the traveling crawler 2, a plurality of truck rollers 24 which keep a ground contact side of the traveling crawler 2 in a ground contact state, and an intermediate roller 25 which retains a non-ground contact side of the traveling crawler 2. The front side of the traveling crawler 2 is supported by the drive sprocket 22, the rear side of the traveling crawler is supported by the tension roller 23, the ground contact side of the traveling crawler 2 is supported by the truck rollers 24, and the non-ground contact side of the traveling crawler 2 is supported by the intermediate roller 25.

As shown in FIGS. 1 and 2, a hair clipper type reaping blade device 52 is provided in a reaping frame 51 which is connected to the reaping rotation supporting point shaft 4a of the reaping device 3, the reaping blade device 52 cutting roots of the unreaped grain straws planted on the farm field. Grain straw erecting devices 53 for six rows are arranged in a forward side of the reaping frame 51, the grain straw erecting devices 53 erecting the unreaped grain straws planted on the farm field. A grain straw conveyance device 54 is arranged between the grain straw erecting devices 53 and a front end portion (a feed starting end side) of the feed chain 6, the grain straw conveyance device 54 conveying the reaped grain straws which are reaped by the reaping blade device 52. Grass dividing bodies 55 for six rows are provided in a protruding manner in a forward side of a lower portion of the grain straw erecting device 53, the grass dividing bodies 55 dividing the unreaped grain straws. The reaping device 3 is structured such as to continuously reap the unreaped grain straws planted on the farm field while moving within the farm field.

Next, a description will be given of the structure of the threshing device 5 with reference to FIGS. 1 and 2. As shown in FIGS. 1 and 2, the threshing device 5 is provided with a threshing cylinder 56 for threshing the grain straws, an oscillation sorting board 57 and a winnower fan 58 which sort the threshed grains coining down to the below of the threshing cylinder 56, a processing cylinder 59 which reprocesses threshed emission matters taken out of a rear portion of the threshing cylinder 56, and a dust exhaust fan 60 which discharges exhaust dust in a rear portion of the oscillation sorting board 57. The grain straws conveyed from the reaping device 3 by the grain straw conveyance device 54 are relayed by the feed chain 6, are conveyed in the threshing device 5 and are threshed by the threshing cylinder 56.

As shown in FIG. 1, a first class grain conveyor 61 and a second class grain conveyor 62 are provided in a lower side of the oscillation sorting board 57, the first class grain conveyor 61 taking out grains (first class grains) sorted by the oscillation sorting board 57, and the second class grain conveyor 62 taking out second class grains such as rachis-branched grains. The oscillation sorting board 57 is structured such that the threshed matters leaking down from a receiving net 67 provided in a tension manner below the threshing cylinder 56 are sorted by oscillation (sorted according to their specific gravities) by a feed pan 68 and a chaff sieve 69. Coarse particulates in the grains coming down from the oscillation sorting board 57 are removed by sorting wind from the winnower fan 58, and the grains come down to the first class grain conveyor 61. The grains taken out of the first class grain conveyor 61 are conveyed in the cereal grain tank 7 via a grain elevating conveyor 63 and are collected in the cereal grain tank 7.

Further, as shown in FIG. 1, the oscillation sorting board 57 is structured such as to make the second class grains such as the rachis-branched grains come down from the chaff sieve 69 to the second class grain conveyor 62 by the oscillation sorting. A sorting fan 71 sorting by wind the second class grains coming down to the below of the chaff sieve 69 is provided. The coarse particulates and the straw wastes in the second class grains coming down from the chaff sieve 69, are removed from the sorting fan 71 by the sorting wind, and the grains come down to the second class grain conveyor 62. An end portion of the second class grain conveyor 62 is connected in a communicating manner to an upper face side of the feed pan 68 via a reduction conveyor 66, and is structured such as to return the second class grains to an upper face side of the oscillation sorting board 67 so as to sort again.

Meanwhile, a straw discharge chain 64 and a straw discharge cutter 65 are arranged in a rear end side (a feed end side) of the feed chain 6, as shown in FIGS. 1 and 2. The discharged straws (the culms from which the grains are threshed) relayed from the rear end side of the feed chain 6 to the straw discharge chain 64 are discharged to the rear side of the travel machine body 1 in a long state, or be discharged to a rearward lower side of the travel machine body 1 after being cut to have an appropriate short length by the straw discharge cutter 65 which is provided in the rear portion of the threshing device 5.

Next, a description will be given of a first case 75 serving as a continuous regeneration type exhaust gas purification device 74 (a diesel particulate filter) and an attaching structure thereof, with reference to FIGS. 4 to 12. As shown in FIGS. 4 to 8, the exhaust gas purification device 74 is provided with a continuous generation type first case 75 which introduces the exhaust gas of the diesel engine 14. The first case 75 serving as the exhaust gas purification case has an inlet, side case 76 and an outlet side case 77. A diesel oxidation catalyst 79 (a gas purification body) such as platinum and a soot filter 80 (a gas purification body) having a honeycomb structure are lined up in series in an exhaust gas moving direction (from a lower side to an upper side in FIG. 7) in inner portions of the inlet side case 76 and the outlet side case 77, the diesel oxidation catalyst 79 producing nitrogen dioxide ($NO_2$), and the soot filter 80 continuously oxidizing and removing collected particulate matter (PM) at a comparatively low temperature. The diesel oxidation catalyst 79 and the soot filter 80 within the inlet side case 76 and the outlet side case 77 are structured such as to reduce carbon monoxide (CO) and carbon hydride (HC) in the exhaust gas in addition to the removal of the particulate matter (PM) in the exhaust gas of the diesel engine 1.

Further, as shown in FIGS. 4 to 8, a purification inlet pipe 81 serving as an exhaust gas inlet pipe is fixed by welding to the inlet side case 76, and one end side of a purification outlet pipe 82 serving as an exhaust gas outlet pipe is fastened by bolts to the outlet side case 77. One end side of an urea mixing pipe 239 (an exhaust pipe) mentioned later is fitted to the other end side of the purification outlet pipe 82, and the urea mixing pipe 239 is connected to the purification outlet pipe 82. The exhaust gas of the diesel engine 14 is introduced into the first case 75 from the purification inlet pipe 81, and the exhaust gas within the first case 75 is discharged to the urea mixing pipe 239 from the purification outlet pipe 82. The inlet side case 76 and the outlet side case 77 are detachably fastened by plural sets of thick intermediate flange bodies 84 and plural bolts 85.

According to the structure mentioned above, the nitrogen dioxide ($NO_2$) produced by an oxidation action of the diesel oxidation catalyst 79 is supplied into the soot filter 80 from one side end surface (an intake side end surface). The particulate matter (PM) included in the exhaust gas of the diesel engine 14 is collected by the soot filter 80, and is continuously oxidized and removed by the nitrogen dioxide ($NO_2$). In addition to the removal of the particulate matter (PM) in the exhaust gas of the diesel engine 14, contents of the carbon monoxide (CO) and the carbon hydride (HC) in the exhaust gas of the diesel engine 14 are reduced.

Next, as shown in FIGS. 4 to 11, an engine room frame 91 is provided in a rising manner on the travel machine body 1, and a rear surface side of the diesel engine 14 mounted to the upper face side of the travel machine body 1 is surrounded by the engine room frame 91. The engine room frame 91 has a left square pipe-shaped support post body 92, a right square pipe-shaped support post body 93, and a square pipe-shaped transverse frame 94 which is integrally welded and fixed firmly at its both end sides to the right and left support post bodies 92 and 93. Further, a pressure welded leg body 95 made of rubber is provided in a rear portion of a bottom surface of the driver cabin 10, the pressure welded leg body 95 in the bottom portion of the driver cabin 10 is brought into contact with upper faces of right and left cradles (support bodies) 96 of the transverse frame 94 from an upper side, and the rear portion of the driver cabin 10 is supported to each of the cradles 96 of the transverse frame 94 so as to come close to and away from in a vertical direction. The diesel engine 14 is installed in an inner portion of an engine room 97 which is formed by the bottom surface side of the driver cabin 10 and the engine room frame 91.

Further, a pair of right and left purification case support bodies 111 are integrally welded and fixed firmly to the transverse frame 94. Further, a front face support bracket 114 is integrally welded and fixed firmly to an outer side surface of the inlet side case 76 in the first case 75. The front face support bracket 114 is arranged in an intermediate portion of a vertical width of the first case 75 (an upper side of the purification inlet pipe 81). A front portion of the front face support bracket 114 is fitted between a pair of right and left purification case support bodies 111 from a rear side, and the front face support bracket 114 is detachably fastened to the purification case support body 111 by an upper bolt 116a and a lower bolt 116b which are threadably attached and operated to as pair of right and left purification case support bodies 111 and right and left side surfaces of the front face support bracket 114 from a lateral direction.

Figure 7:
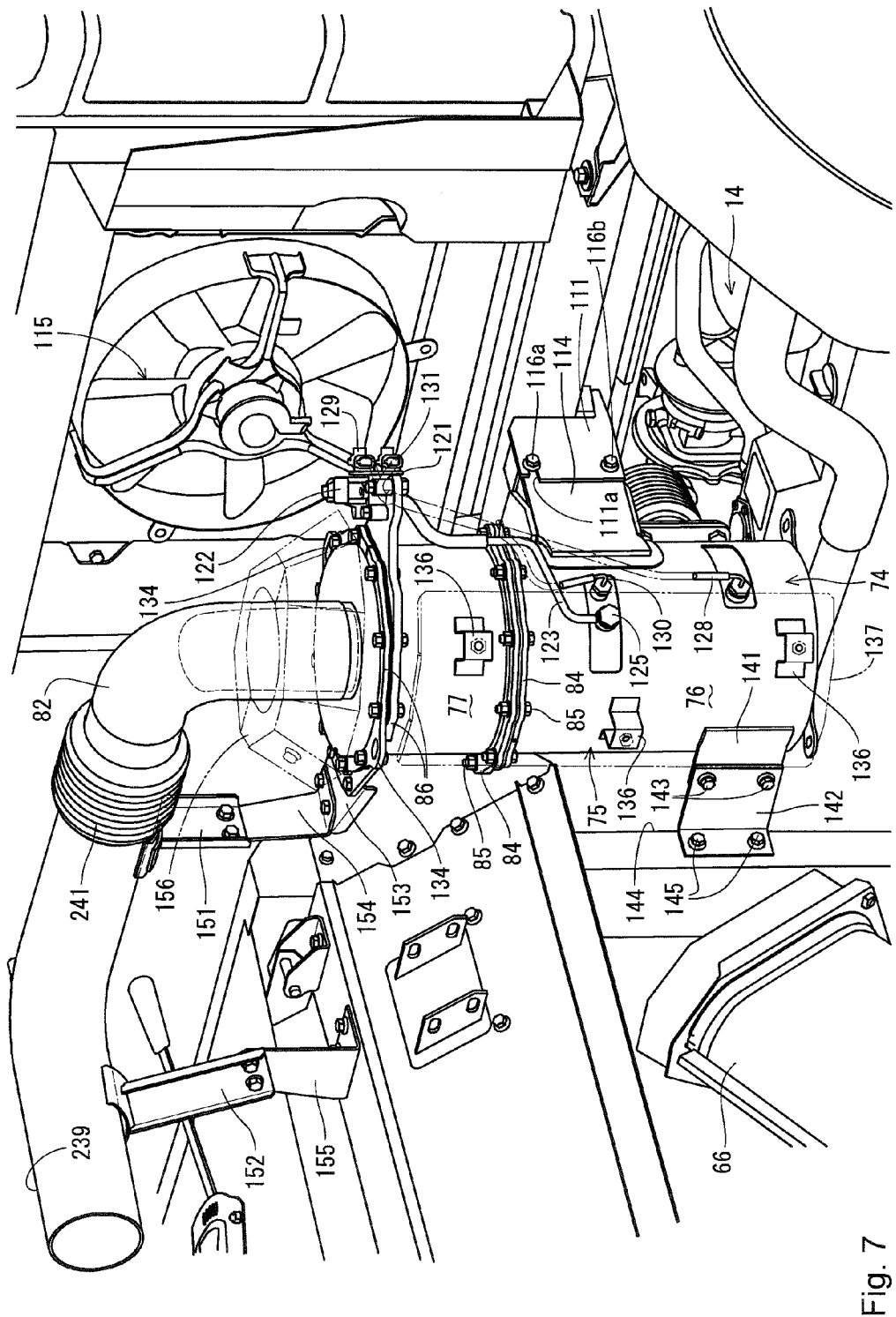
FIG. 7 is an enlarged explanatory view of FIG. 4.
Figure 8:
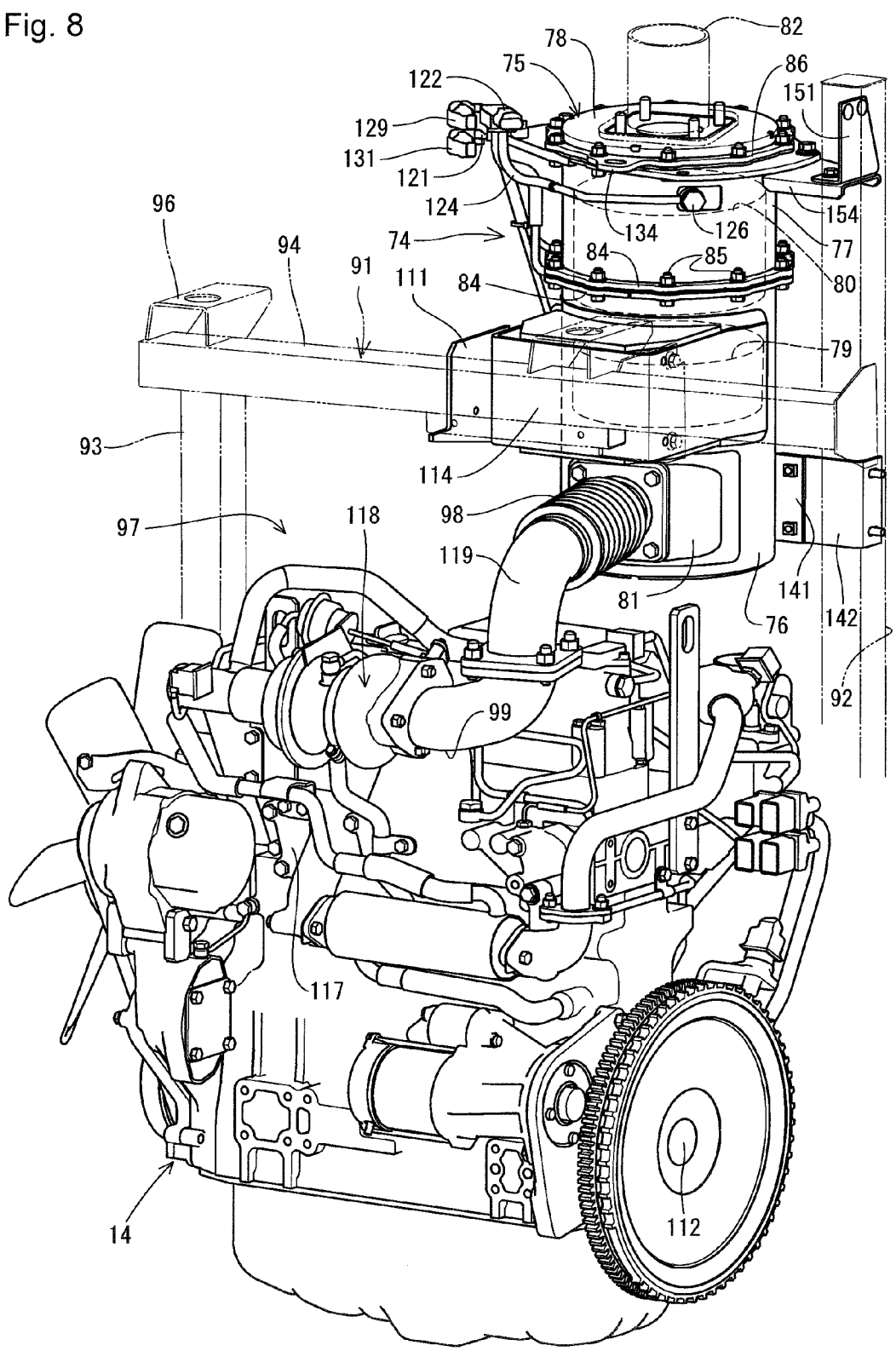
FIG. 8 is a perspective view of an engine and a front face of a first case.
Figure 9:
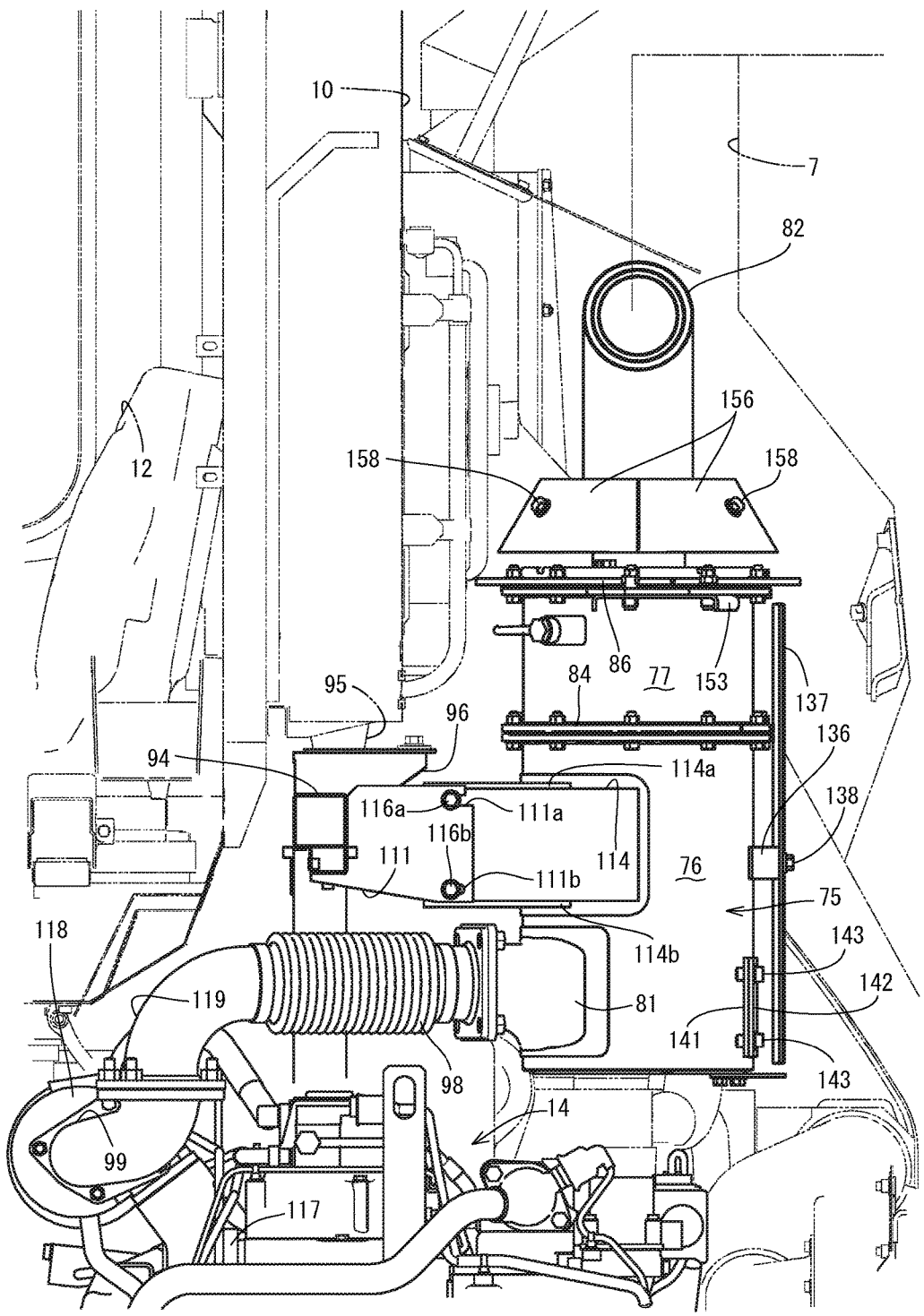
FIG. 9 is a left side elevational view of the first case.
Figure 10:
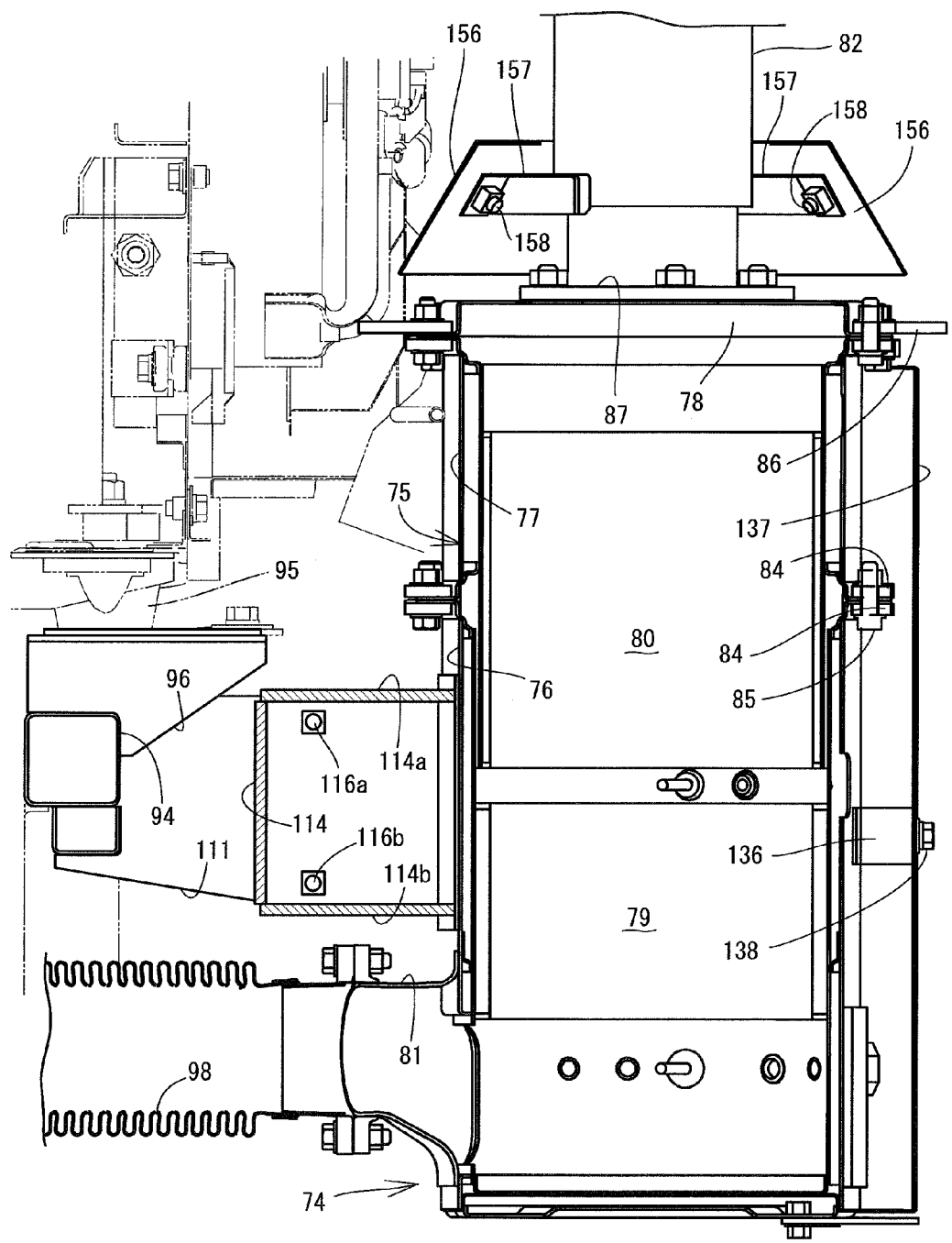
FIG. 10 is an explanatory view of a left cross section of the same.

As shown in FIGS. 7 and 9, the upper bolt 116a is locked to an engagement notch 111a of the purification case support body 111 so as to be freely engaged and disengaged, and the lower bolt 116b is passed through position regulating long hole 111b of the purification case support body 111. In other words, in the case that the exhaust gas purification device 74 is assembled, the upper bolt 116a is temporarily fastened to the front face support bracket 114, the exhaust gas purification device 74 is moved close to an attaching position of the purification case support body 111, the upper bolt 116a is engaged with the engagement notch 111a of the purification case support body 111, and the first case 75 is temporarily fastened to the purification case support body 111. Thereafter, the lower bolt 116b is passed through the position regulating long hole 111b of the purification case support body 111, the lower bolt 116b is fastened to the front face support bracket 114, the upper bolt 116a is fastened to the front face support bracket 114, the front face support bracket 114 is detachably attached firmly to the purification case support body 111 via each of the bolts 116a and 116b, and the exhaust gas purification device 74 is installed to a back face side of the engine room 97 via the transverse frame 94. As shown in FIG. 10, the front face support bracket 114 is formed into a quadrangular box shaped high rigidity structure by fixing by welding a top plate body 114a and a bottom plate body 114b to an upper end side and a lower end side of the front face support bracket 114 having a U-shaped form in a plan view.

More specifically, the engine room 97 is formed in a lower side of the cabin 10, the cabin 10 is movably installed toward a forward upper side (an externally lateral side) of the travel machine body 1, the cradle 96 supporting the cabin 10 and the purification case support body 111 supporting the first case 75 are arranged at the same position (the transverse frame 94) of the engine room frame 91, and the cabin 10 can be moved close to and away from the first case 75.

Further, as shown in FIGS. 4 to 8 and 12, a side face support bracket 141 is integrally welded and fixed firmly to a left outer peripheral surface of the inlet side case 76 in the first case 75. The front face support bracket 114 and the side face support bracket 141 are arranged radially (in a cross direction) on the same circumference in an outer side surface of the inlet side case 76. One end side of an assembly regulation plate 142 is fastened by bolts 143 to the side face support bracket 141 so that its position can be freely regulated, and the other end side of the assembly regulation plate 142 is fastened by bolts 145 to a right side surface of a machine casing frame 144 of the threshing device 5. The side face support bracket 141 and the machine casing frame 144 are connected and fixed so that their position can be freely regulated via the assembly regulation plate 142. The side surface of the purification case support body 111 and the right side of the threshing device 5 are detachably connected via the side face support bracket 141. In other words, the front face of the inlet side case 76 is fastened and fixed to the engine room 97 side (the transverse frame 94), and the left side surface of the inlet side case 76 is fastened and fixed to the threshing device 5 side (the machine casing frame 144).

More specifically, as shown in FIGS. 4 to 8, the intermediate portion of the first case 75 is firmly fixed to the engine room frame 91 via the inlet side case 76 in a vertical posture. Further, the purification inlet pipe 81 is provided in a forward directing posture in the front side surface of the first case 75 in the exhaust gas supply side in the lower end side of the first case 75, and the purification inlet pipe 81 is extended toward the upper face side of the engine 14 (the machine body front side). An exhaust manifold 117 and a supercharger 118 are arranged in the upper portion in the front face side of the engine 14 which is mounted to the travel machine body 1 in a state in which a output shaft 112 is directed in a lateral direction. One end side of an exhaust connection pipe 119 is connected to the purification inlet pipe 81 via a bendable bellows-like exhaust introduction pipe 98, and the other end side of the exhaust connection pipe 119 is connected to an exhaust outlet pipe 99 of the supercharger 118. The first case 75 is connected in a communication manner to the exhaust manifold 117 via the supercharger 118 and the exhaust connection pipe 119.

Figure 4:
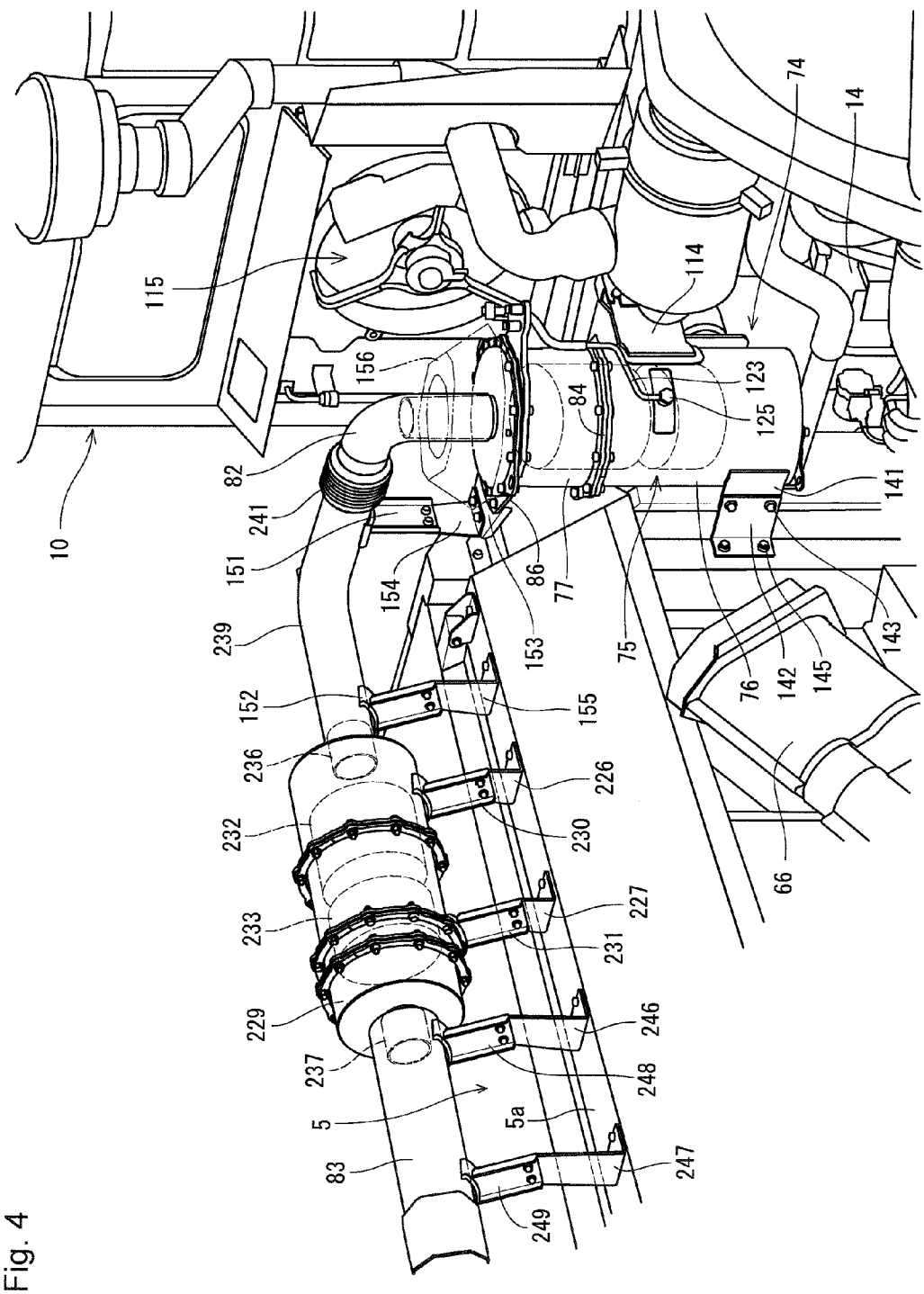
FIG. 4 is a perspective view of a back face of a first case attaching portion.
Figure 5:
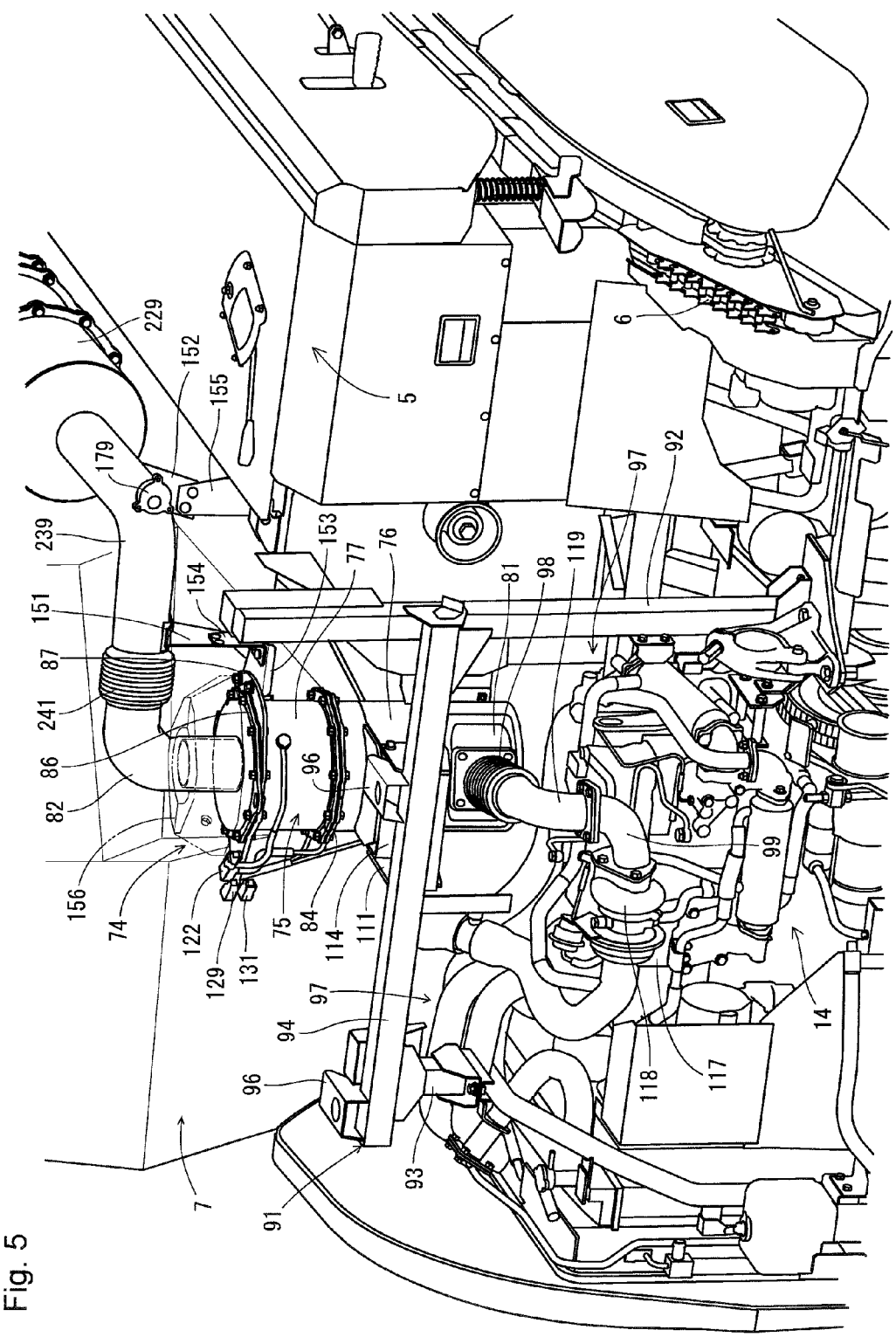
FIG. 5 is a perspective view of a front face of the same.

Further, as shown in FIG. 4, the first case 75 formed into a vertically long cylindrical shape (in a vertical posture) is arranged in a space which is formed between the front face of the cereal grain tank 7 and the rear face of the cabin 10, in a right lateral side of the threshing device 5, and is structured such as to introduce the exhaust gas in the engine 14 to the first case 75 via the exhaust manifold 117, the supercharger 118 and the exhaust connection pipe 119. Further, the exhaust gas is discharged from the urea mixing pipe 239, and a second case 229 and a tail pipe 83 which are mentioned later, toward a rear side in the upper face side between the threshing device it and the cereal grain tank 7.

Meanwhile, as shown in FIGS. 4 to 7, 10 and 11, there are provided a pipe inlet side support body 151 and a pipe outlet side support body 152 which are firmly fixed respectively to an exhaust inlet side and an exhaust outlet side of an L-shaped round pipe-like urea mixing pipe 239. A left end portion of a thick plate-like upper end flange body 86 in an upper face portion of the first case 75 is protruded in a direction of the threshing device 5, one end side of an exhaust support table 153 is fastened to a left end portion of the upper end flange body 86, and the other end side of the exhaust support table 153 is protruded from the left end portion of the upper end flange body 86 toward the threshing device 5. A lower end side of the inlet side bracket 154 is fastened by bolts to the other end side of the exhaust support table 153, the inlet side bracket 154 is provided in a rising manner in the exhaust support table 153, and a lower end side of the pipe inlet side support body 151 is fastened by bolts to an upper end side of the inlet side bracket 154.

Further, an outlet side bracket 155 is fastened by bolts to a right side portion of the upper face of the threshing device 5, the outlet side bracket 155 is provided in a rising manner in the upper face of the threshing device 5 (a corner in a right upper portion of the threshing machine casing), and a lower end side of the pipe outlet side support body 152 is fastened by bolts to an upper end side of the outlet side bracket 155. The urea mixing pipe 239 is extended over the upper face of the first case 75 and the upper face of the threshing device 5 via the pipe inlet side support body 151 and the pipe outlet side support body 152 which are respectively provided in a rising manner in the upper face sides of the threshing device 5 and the first case 75. The urea mixing pipe 239 is supported to each of the upper face sides of the threshing device 5 and the first case 75.

Figure 13:
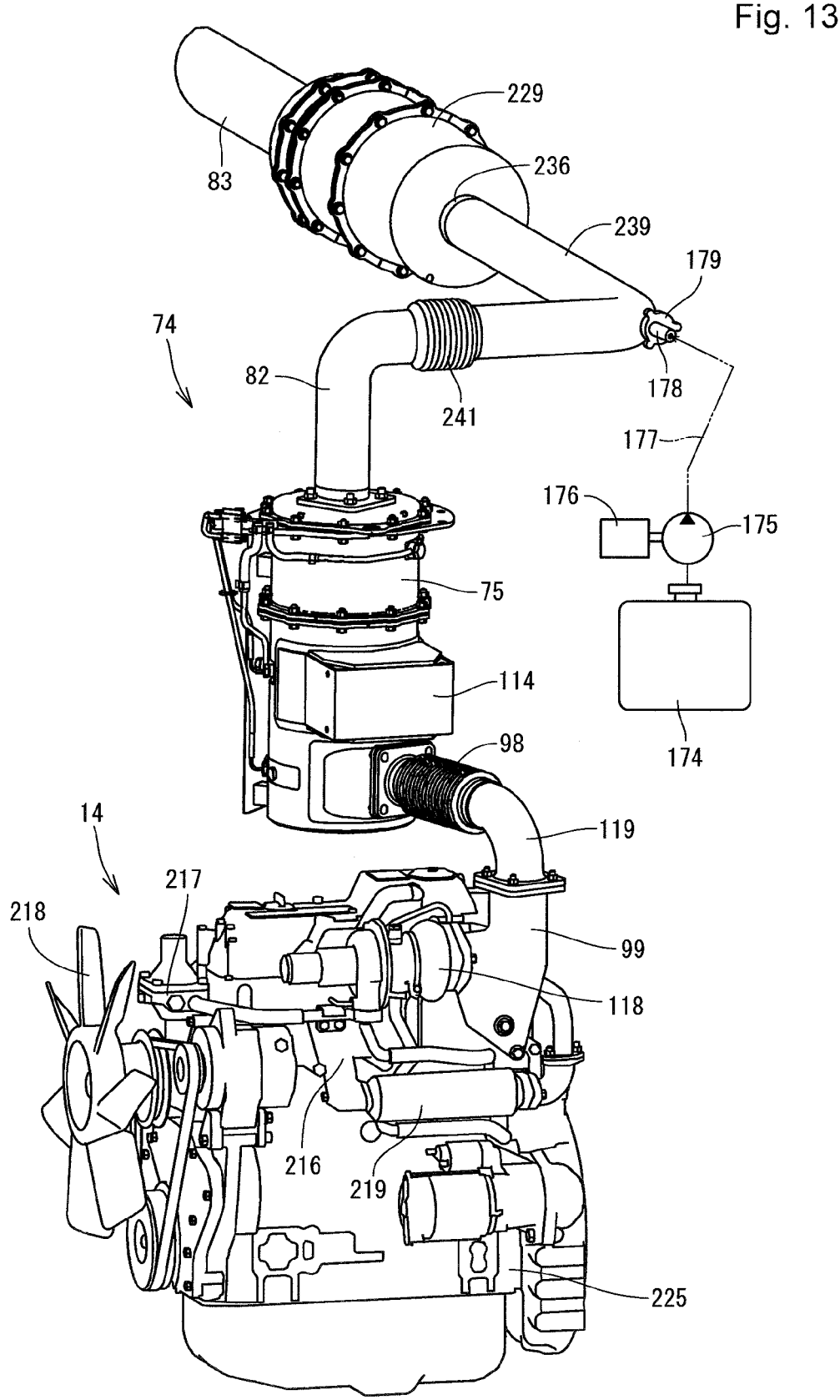
FIG. 13 is a perspective view of the front side of the engine, the first case and a second case.

Further, as shown in FIG. 13, there are provided an urea water injection pump 175 which pressure feeds urea aqueous solution within an urea water tank 174 mounted to the travel machine body 1, an electric motor 176 which drives the urea water injection pump 175, and an urea water injection nozzle 178 which is connected to the urea water injection pump 175 via an urea water injection pipe 177. The urea water injection nozzle 178 is attached to the urea mixing pipe 239 via an injection pedestal 179, and the urea aqueous solution is sprayed to an inner portion of the urea mixing pipe 239 from the urea water injection nozzle 178. The urea water supplied into the urea mixing pipe 239 is mixed as ammonia with the exhaust gas which moves to the second case 229 from the first case 75.

Figure 11:
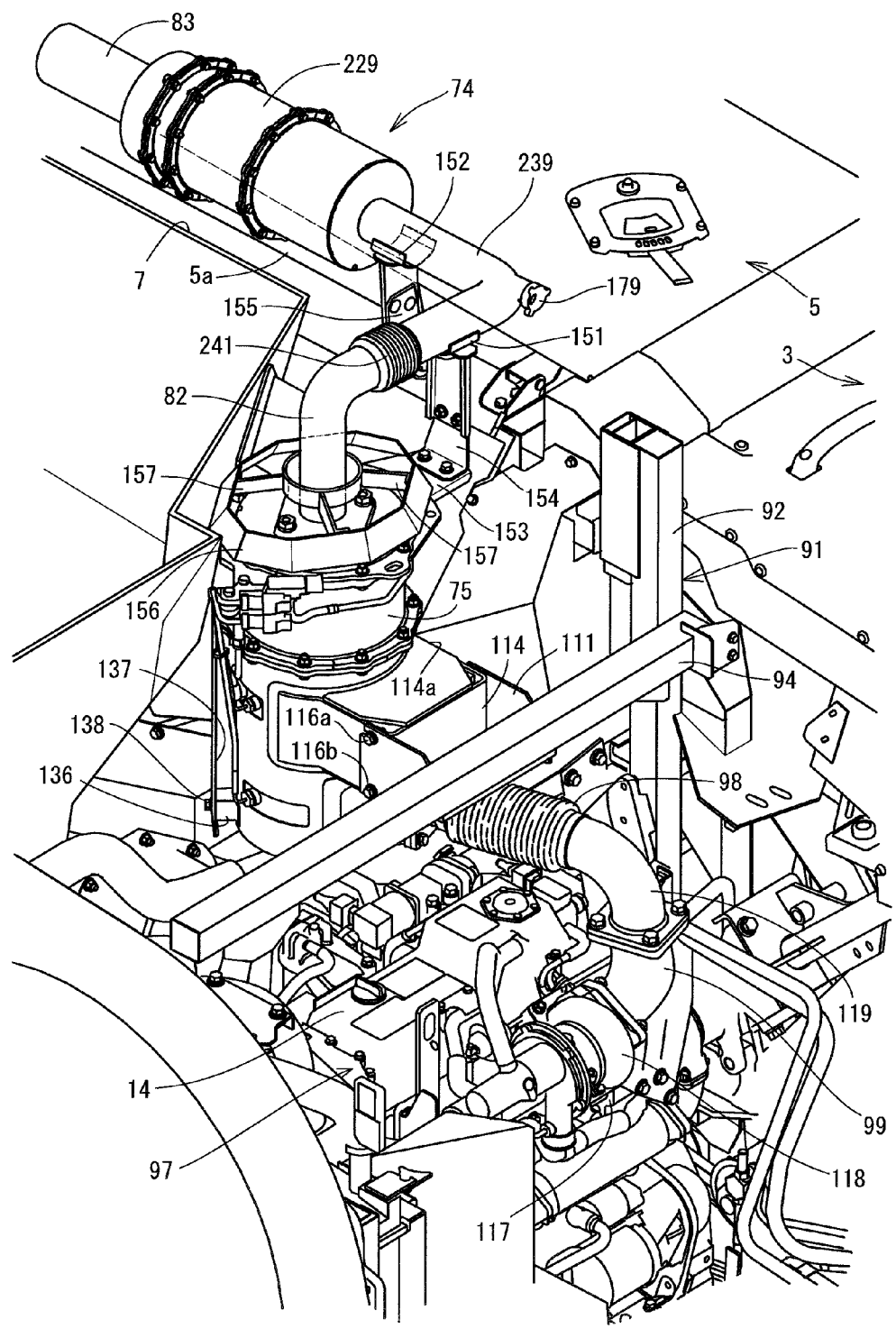
FIG. 11 is an explanatory view of an upper face side of the first case and a second case.
Figure 12:
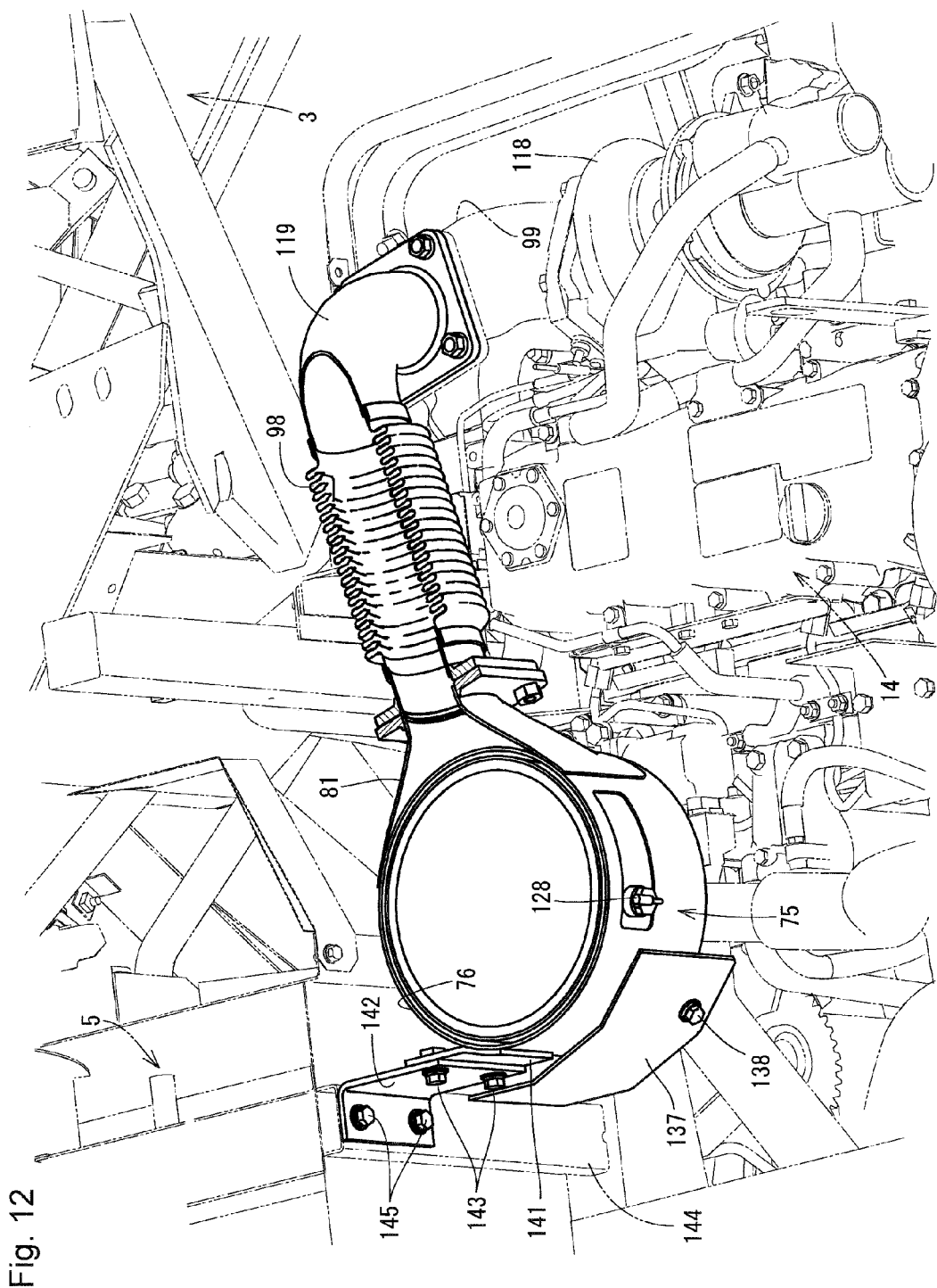
FIG. 12 is an explanatory view of a left attaching portion of the first case.

As shown in FIGS. 9 to 11, there are provided an upper face cover body 156 which covers the upper face side of the first case 75 and is formed into an umbrella shape. Cover support brackets 157 are radially fixed by welding to an outer peripheral surface of the purification outlet pipe 82. The upper face cover body 156 is detachably fastened by bolts 158 to the cover support brackets 157. The upper face cover body 156 is structured such as to prevent the dusts and the straw wastes from piling up to the upper face of the first case 75. An outlet side lid body 78 is detachably fastened and fixed to the outlet side case 77 in the first case 75 via plural sets of thick plate-like upper end flange bodies 86. An outlet pipe flange body 87 is fixed by welding to a lower end side of the purification outlet pipe 32, and the purification, outlet pipe 82 is supported to the outlet side case 77 via the outlet side lid body 78.

Figure 6:
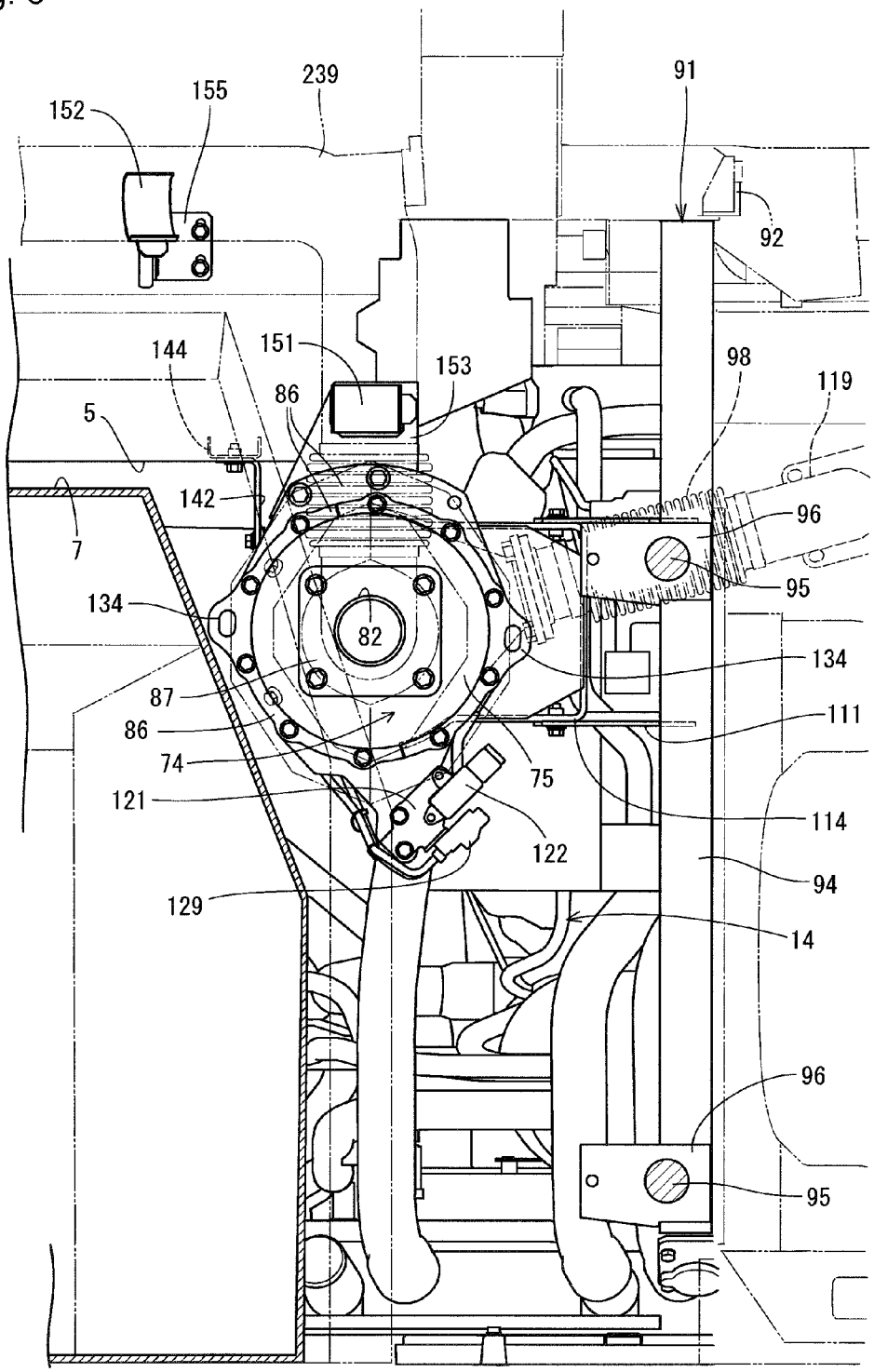
FIG. 6 is an explanatory view of a plane of the same.

Meanwhile, as shown in FIGS. 6 and 7, a pair of suspension engagement hole bodies 134 are provided in an upper end side in the outer side surface of the first case 75 (the exhaust gas purification device 74). A pair of suspension engagement hole bodies 134 are integrally formed in a front end portion and a rear end portion of the thick plate-like upper end flange body 86 by protruding a front end edge and a rear end edge of the upper end flange body 86 in a radial direction. Therefore, in an assembly plant of the combine harvester, a hook of the load suspension device, for example, a chain block or a hoist is locked to the suspension engagement hole body 134, the first case 75 is suspended to the chain block via the suspension engagement hole body 134 (the upper end flange body 86), and the heavy first case 75 is carried and moved. It is possible to easily execute a work for assembling or detaching the first case 75, and it is possible to improve an attaching and detaching workability of the exhaust gas purification device 74.

Further, a sensor bracket 121 is arranged in a right side portion in an upper end side of the first case 75 by fastening the sensor bracket 121 by bolts to the thick plate-like flange body 86 which protrudes radially in a right direction of the outlet side case 77. A differential pressure sensor 122 integrally provided with an electric wiring connector is attached to a flat upper face of the sensor bracket 121 which is protruded laterally from the first case 75. Each of one end sides of an upstream side sensor piping 123 and a downstream side sensor piping 124 which are not illustrated is connected to the differential pressure sensor 122. The other end sides of the sensor pipings 123 and 124 in the upstream side and the downstream side are connected respectively to sensor piping boss bodies 125 and 126 in an upstream side and a downstream side which are arranged in the first case 75, in such a manner as to pinch the soot filter 80 within the first case 75.

According to the structure mentioned above, a difference between the exhaust gas pressure in the inflow side of the soot filter 80 and the exhaust gas pressure in the outflow side of the soot filter 80 (the differential pressure of the exhaust gas) is detected via the differential pressure sensor 122. Since residual volume of the particulate matter in the exhaust as collected by the soot filter 80 is in proportion to the differential pressure of the exhaust gas, a regeneration control for reducing an amount of the particulate matter of the soot filter 80 (for example, a control for raising a temperature of the exhaust gas) is executed on the basis of a result of detection of the differential pressure sensor 122 in the case that the amount of the particulate matter remaining in the soot filter 80 is increased to a predetermined amount or more. Further, in the case that the residual volume of the particulate matter is further increased to a regeneration controllable range or more, a maintenance work for manually removing the particulate matter is carried out by detachably disassembling the first case 75 and cleaning the soot filter 80.

Further, an electric wiring connector is integrally provided in an outer case portion of the differential pressure sensor 122 and is electrically wired, and there are provided an upstream side gas temperature sensor 128 which detects the temperature of the exhaust gas in the exhaust gas intake side of the diesel oxidation catalyst 79, and a downstream side gas temperature sensor 130 which detects the temperature of the exhaust gas in the exhaust gas discharge side of the diesel oxidation catalyst 79. The electric wiring connector 129 of the upstream side gas temperature sensor 128, and the electric wiring connector 131 of the downstream side gas temperature sensor 130 are firmly fixed to the sensor bracket 121.

Further, the differential pressure sensor 122 for the exhaust gas and the electric wiring connectors 129 and 131 serving as the connector for the exhaust gas temperature sensor are arranged in the upper portion of the first case 75 via the sensor bracket 121. The connectors 129 and 131 are supported in a state where the connecting directions of the electric wiring connector of the differential pressure sensor 122, the electric wiring connector 129 of the upstream side gas temperature sensor 128, and the electric wiring connector 131 of the downstream side gas temperature sensor 130 are the same. Further, the upper portion of the first case 75 is arranged so as to face to an air discharge portion of an air conditioning fan 115 which is installed to a back face of the cabin 10. Therefore, it is possible to cool the differential pressure sensor 122 or the wiring of each of the connectors 129 and 131 by the discharged air of the air conditioning fan 115. It is possible to prevent them from burning out by the discharged air heat in the first case 75 side and it is possible to improve durability of them.

Meanwhile, as shown in FIGS. 1, 7 and 9 to 11, the rear portion of the cereal grain tank 7 is supported to the vertically take-out conveyor 8a which supports the discharge auger 8, the front side of the cereal grain tank 7 is horizontally turned around the take-out conveyor 8a, and the cereal grain tank 7 is provided so as to be movable toward the externally lateral side. Further, a plurality of cover support tables 136 are fixed by welding to a rear face side of the first case 75 which faces to the cereal grain tank 7, and a rear face cover body 137 is detachably fastened by bolts 133 to the cover support tables 136. More specifically, the first case 75 is arranged between the engine room 97 (the engine room frame 91) and the cereal grain tank 7, and the rear face cover body 137 is arranged between the cereal grain tank 7 and the first case 75. The rear face cover body 137 is structured such as to prevent a worker from coming into contact with the first case 75 when the worker carries out a maintenance work by moving the cereal grain tank 7 toward an externally lateral side and opening a rear side of the engine room 97.

Next, as shown in FIGS. 1 to 4, 11 and 18 to 16, there are provided the first case 75 serving as a diesel particulate filter (DPF) which removes the particulate matter in the exhaust gas of the diesel engine 1, and the second case 229 serving as an urea selective catalyst reduction (SCR) system which removes the nitrogen oxide in the exhaust gas of the diesel engine 1, as the exhaust gas purification device 74 for purifying the exhaust gas discharged from each of the cylinders of the diesel engine 1. The oxidation catalyst 79 and the soot filter 80 are inward provided in the first case 75. An urea selective catalyst reducing SCR catalyst 232 and an oxidation catalyst 233 are inward provided in the second case 229.

The exhaust gas discharged to the exhaust manifold 6 from each of the cylinders of the diesel engine 14 is discharged to an external portion via the exhaust gas purification device 74. The exhaust gas purification device 74 is structured such as to reduce the carbon monoxide (CO), the carbon hydride (HC), the particulate matter (PM) and the nitrogen oxide (NOx) in the exhaust gas of the diesel engine 14.

The first case 75 is structured as a vertically long cylindrical shape which extends longer in a vertical direction. Meanwhile, the second case 229 is structured as a transversely long cylindrical shape which extends longer in a back-and-forth direction. Further, an SCR inlet pipe 236 taking in the exhaust gas and an SCR outlet pipe 287 discharging the exhaust gas are provided in both sides (in one end side and the other end side in an exhaust gas moving direction) of the second case 229.

As mentioned above, the exhaust was of the diesel engine 14 is introduced into the first case 75. Meanwhile, the SCR inlet pipe 236 is connected to the purification outlet pipe 82 via the urea mixing pipe 239, and the exhaust was in the first case 75 is introduced into the second case 229. In addition, the purification outlet pipe 82 and the urea mixing pipe 239 are connected to a bellows-like connection pipe 241 which is bendable and extensible. The urea water supplied into the urea mixing pipe 239 is structured such as to be mixed as the ammonia into the exhaust was leading to the second case 229 from the first case 75.

Figure 14:
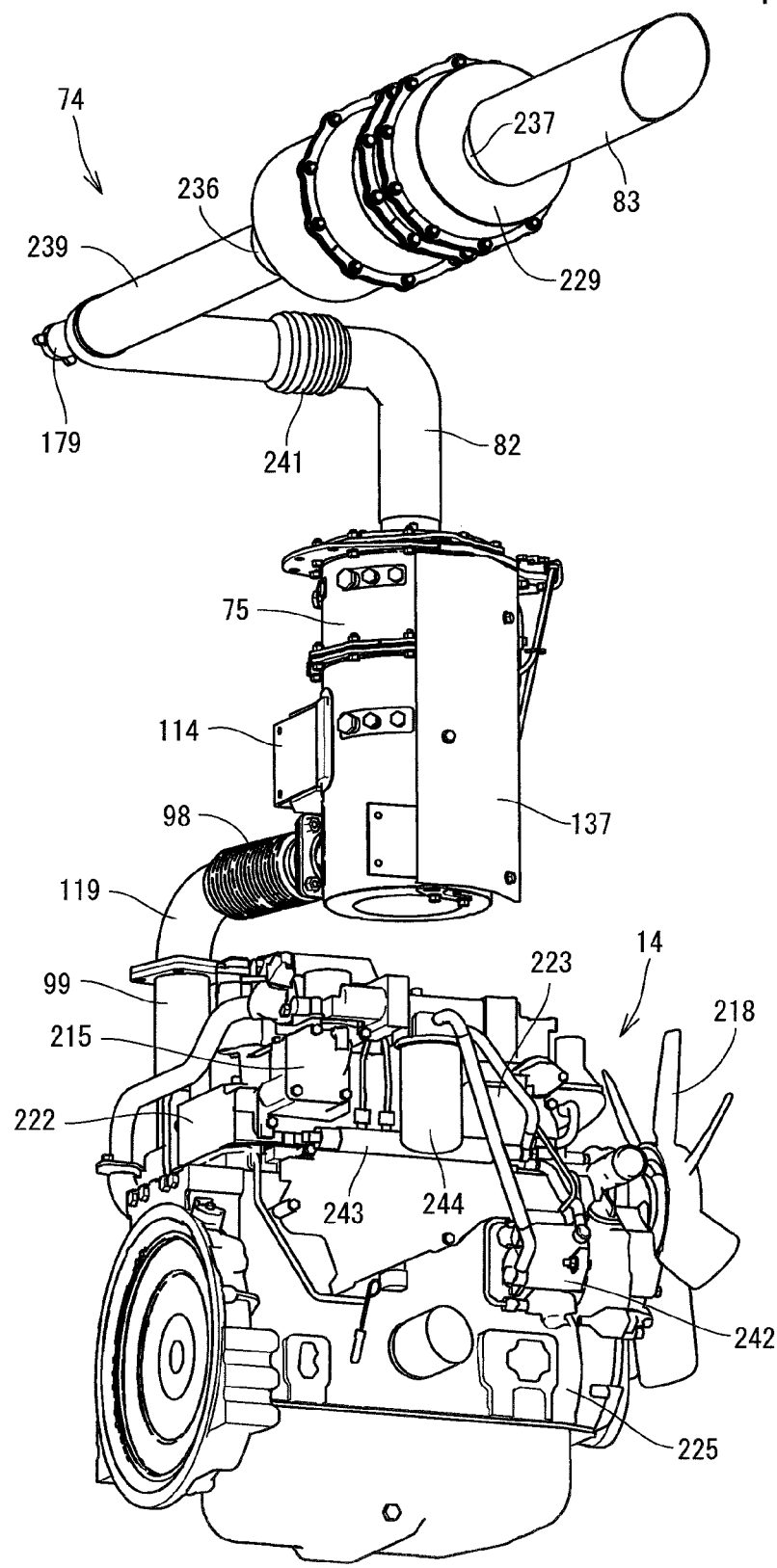
FIG. 14 is a perspective view of the hack side of the engine, the first case and the second case.
Figure 15:
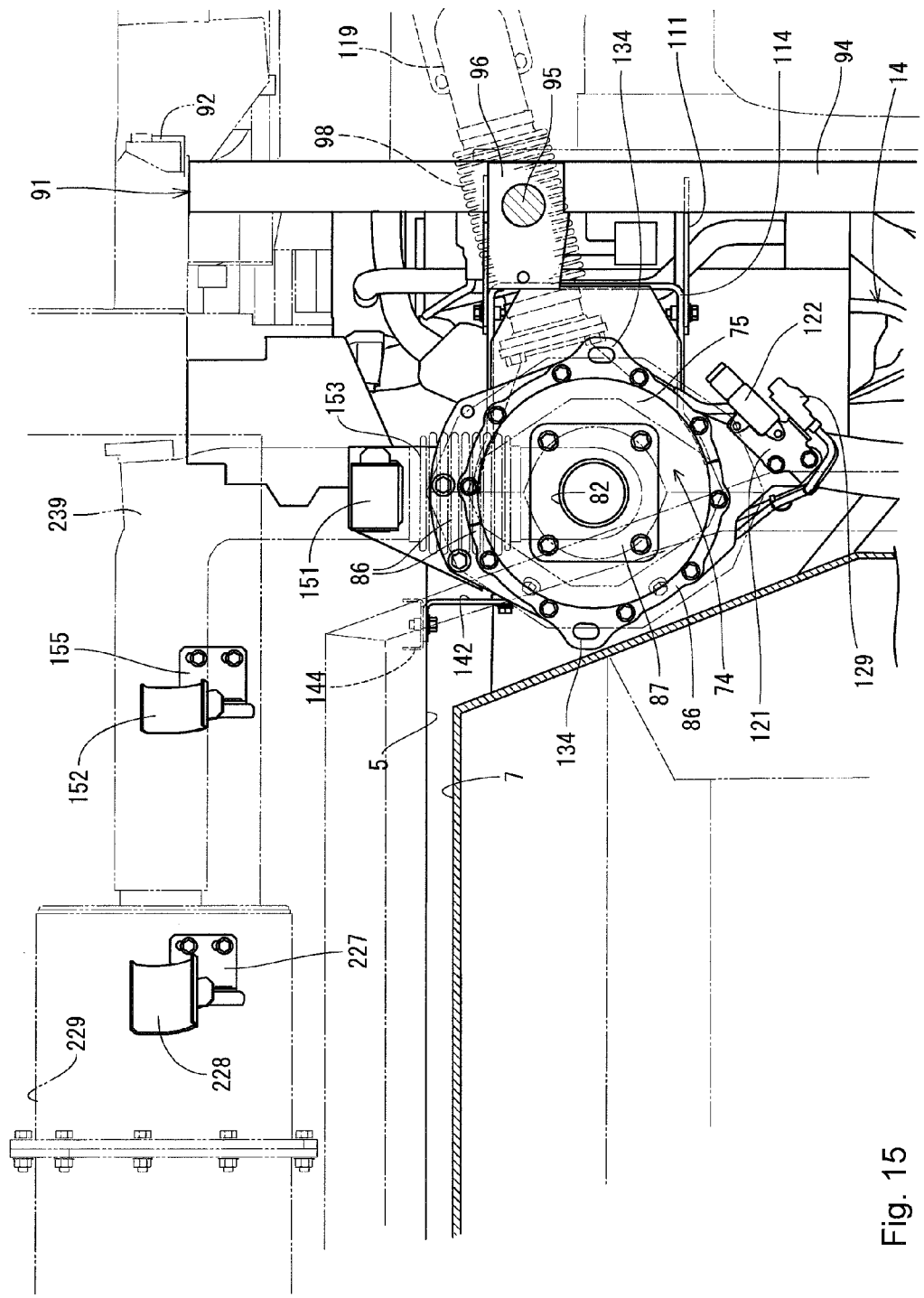
FIG. 15 is a plan explanatory view of the first case attaching portion.

As shown in FIGS. 13 and 14, an intake manifold 223 is installed in a right surface of a cylinder head 222 in a side surface of the diesel engine 14. An exhaust gas recirculation device (EGR) 215 taking the exhaust gas for recirculation is arranged in the intake manifold 223. An air cleaner (not shown) is connected to the intake manifold 223. External air from which dust is removed and purified by the air cleaner is fed to the intake manifold 223, and is structured such as to be supplied to each of the cylinders of the diesel engine 14. An exhaust manifold 216 is installed to a left surface of the cylinder head 222 in the side surface of the diesel engine 14.

According to the structure mentioned above, since a part of the exhaust gas discharged out of the diesel engine 14 to the exhaust manifold 216 is flowed back to each of the cylinders of the diesel engine 41 from the intake manifold 223 via the exhaust gas recirculation device 215, the combustion temperature of the diesel engine 14 decreases, an amount of discharged of the nitrogen oxide (NOx) from the diesel engine 14 is reduced, and a fuel consumption of the diesel engine 14 is improved.

There is provided a cooling water pump 217 which circulates the cooling water to an inner side of the cylinder block 225 and a radiator (not shown). The cooling water pump 217 is arranged in an installing side of the cooling fan 218 of the diesel engine 14. The cooling water is fed into the cylinder block 225 from the cooling water pump 217 via an EGR cooler 219 of the exhaust gas recirculation device 215 by driving the cooling water pump 217 and the cooling fan 218. Meanwhile, the diesel engine 14 is cooled by the wind of the cooling fan 218. The cooling water pump 217 and the cooling fan 218 are connected to an engine output shaft of the diesel engine 14 via a V-belt or the like.

As shown in FIG. 14, each of injectors (not shown) for the multiple cylinders of the engine 14 is provided with a fuel pump 242 and a common rail 243 which connect a fuel tank (not shown) mounted to the travel machine body 1. The common rail 243 and the fuel filter 244 are arranged in a side surface in the installation side of the intake manifold 223 in a night side surface of the cylinder head 222, in the side surface of the diesel engine 14, and the fuel pinup 242 is arranged in the cylinder block 225 below the intake manifold 223. Each of the injectors has an electromagnetically opening and closing control type fuel injection valve (not shown).

The fuel within the fuel tank is sucked into the fuel pump 242 via the fuel filter 244. Meanwhile, the common rail 243 is connected to a discharge side of the fuel pump 242, and the cylindrical common rail 243 is connected to each of the injectors of the diesel engine 14. A surplus of the fuel fed under pressure to the common rail 243 from the fuel pump 242 is returned to the fuel tank, the high-pressure fuel is temporarily stored within the common rail 243, and the high-pressure fuel within the common rail 243 is supplied to an inner portion of each of the cylinders of the diesel engine 14.

According to the structure mentioned above, the fuel in the fuel tank is pressure fed to the common rail 243 by the fuel pump 242, the high-pressure fuel is stored in the common rail 243, and a fuel injection valve of each of the injectors is controlled to be opened and closed. As a result, the high-pressure fuel within the common rail 243 is injected to each of the cylinders of the diesel engine 14. In other words, it is possible to precisely control an injection pressure, an injection timing and an injection term (an injection amount) by electronically controlling the fuel injection valve in each of the injectors. Therefore, it is possible to reduce the nitrogen oxide (NOx) discharged from the diesel engine 14.

As shown in FIGS. 4 and 11, the second case 229 is supported to the upper face side of the threshing device 5. Case brackets 226 and 227 are fastened by bolts to a right side portion of the upper face of the threshing device 5, the front and rear case brackets 226 and 227 are provided in a rising manner on the upper face of the threshing device 5 (the threshing upper face frame 5a in the corner of the right upper portion of the threshing machine casing), and lower end sides of front and rear second case support bodies 230 and 231 are fastened by bolts to upper end sides of the case brackets 226 and 227. The second case 229 is firmly fixed to upper end sides of the front and rear second case support bodies 230 and 231, and the second case 229 is supported to the upper face of the threshing device 5 via the case brackets 226 and 227 which are provided in a rising manner in the upper face side of the threshing device 5 and the second case support bodies 230 and 231.

As shown in FIGS. 4 and 11, the tail pipe 83 is supported to the upper face side of the threshing device 5. Front and rear pipe brackets 246 and 247 are fastened by bolts to the right side portion on the upper face of the threshing device 5, the front and rear pipe brackets 246 and 247 are provided in a rising manner on the upper face of the threshing device 5 (the threshing upper face frame 5a in the corner of the right upper portion of the threshing machine casing), and lower end sides of front and rear pipe support bodies 248 and 249 are fastened by bolts to upper end sides of the pipe brackets 246 and 247. The front and rear end portions of the tail pipe 83 are firmly fixed to the upper end sides of the front and rear pipe support bodies 248 and 249, and the tail pipe 83 is supported to the upper face of the threshing device 5 via the pipe brackets 246 and 247 which are provided in a rising mariner in the upper face side of the threshing device 5 and the pipe support bodies 248 and 249.

According to the structure mentioned above, the exhaust gas purified by the second case 229 is discharged out of the tail pipe 83 toward the upper face side in the rear portion of the threshing device 5. A gap is formed in a connection portion between the small-diameter side SCR outlet pipe 237 and the large-diameter side tail pipe 83, and the exhaust gas having the lowered exhaust gas temperature is discharged from the tail pipe 83, by sucking the outside air into the tail pipe 83 from the gap and mixing the outside air into the exhaust gas from the SCR outlet pipe 237.

According to the structure mentioned above, the carbon monoxide (CO) and the carbon hydride (HC) in the exhaust gas of the diesel engine 14 can be reduced by the oxidation catalyst 79 and the soot filter 80 within the first case 75. Next, the urea water from the urea water injection nozzle 178 is mixed into the exhaust gas from the diesel engine 14, in the inner portion of the urea mixing pipe 239. Further, the nitrogen oxide (NOx) in the exhaust gas to which the urea water is mixed as the ammonia is reduced by the SCR catalyst 232 and the oxidation catalyst 233 within the second case 229, and is discharged to the outside from the tail pipe 83.

Figure 16:
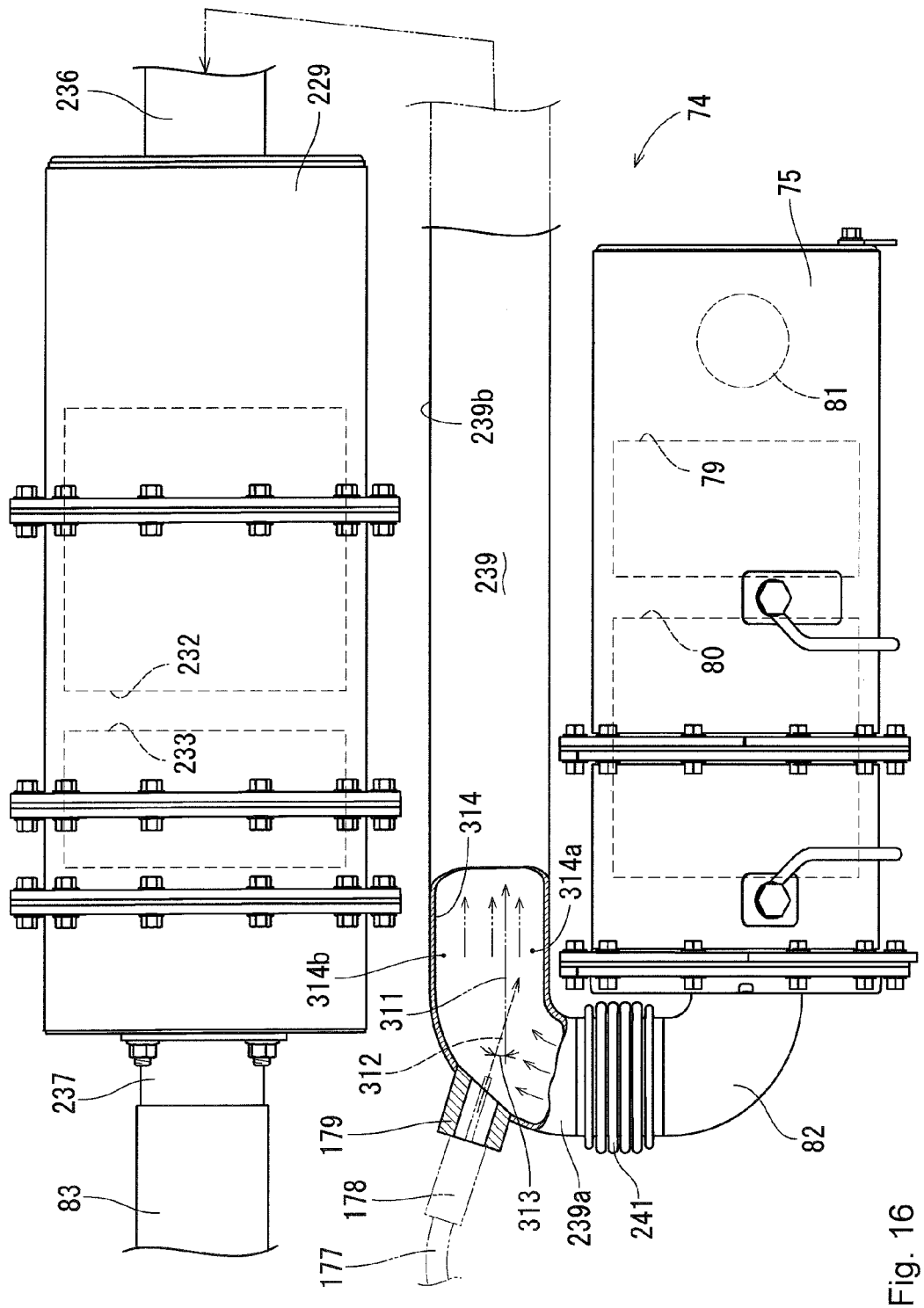
FIG. 16 is an explanatory view of the first case, the second case and an urea mixing pipe.

Next, a description will be given of a structure of the urea mixing pipe 239 portion with reference to FIG. 16. As shown in FIG. 16, the urea mixing pipe 239 has an elbow pipe portion 239a which is connected to the bellows-like connection pipe 241, and a long cylindrical straight pipe portion 239b which is connected to the SCR inlet pipe 36. The injection pedestal 179 is fixed by welding to the elbow pipe portion 239a near the connection between the elbow pipe portion 239a and the straight pipe portion 239b, and the urea water injection nozzle 178 is open toward an inner hole of the straight pipe portion 239b from the elbow pipe portion 239a side.

Further, as shown in FIG. 16, an urea water injecting direction 312 of the urea water injection nozzle 178 is inclined at a predetermined angle of incline 313 (about 4 degrees) toward the exhaust gas downstream side of the elbow pipe portion 239a in relation to a cylindrical axis line 311 of the cylindrical straight pipe portion 239b (an exhaust gas flowing direction within the straight pipe portion 239b). In other words, the urea water is injected from the urea water injection nozzle 178 toward an inner wall surface 314a side in a curve inner diameter side of the elbow pipe portion 239a, in an inner wall surface 314 of the straight pipe portion 239b. The urea water injected from the urea water injection nozzle 178 is diffused toward an inner wall surface 314b side in a curve outer diameter side of the elbow pipe portion 239a, in the inner wall surface 314 of the straight pipe portion 239b, on the basis of discharge pressure of the exhaust gas moving from the elbow pipe portion 239a to the straight pipe portion 239b, and is mixed into the exhaust gas as the ammonia.

The angle of incline 313 (the urea water injecting direction 312) of the urea water injection nozzle 178 in relation to the cylindrical axis line 311 of the straight pipe portion 39b is decided on the basis of inner diameters of the elbow pipe portion 239a and the straight pipe portion 239b, or flow rate of the exhaust gas under a standard operation an operation in a rated rotation of the diesel engine 14). For example, when the angle of incline 313 is too large, the urea water is attached to the inner wall surface 314a in the curve inner diameter side of the elbow pipe portion 239a, and there is a problem that the urea tends to crystallize in the inner wall surface 314a portion in the curve inner diameter side. Further, when the angle of incline 313 is too small, the urea water is attached to the inner wall surface 314b in the curve outer diameter side of the elbow pipe portion 239a, and there is a problem that the urea tends to crystallize in the inner wall surface 314b in the curve outer diameter side.

As shown in FIGS. 4, 6, 11 and 13, in the engine device of the working vehicle having the first case 75 which removes the particulate matter in the exhaust gas of the diesel engine 14, and the second case 229 which removes the nitrogen oxide in the exhaust gas of the diesel engine 14, the first case is provided in the outer side of the engine room 97 inward provided with the diesel engine 14 via the first case support body, and the second case 229 is provided in the threshing device 5 which serves as the working portion in adjacent to the engine room 7 via the second case support bodies 230 and 231. Therefore, the load of the second case 229 can be borne by the threshing upper face frame 5a of the threshing device 5 while the load of the first case 75 is borne by the frame of the engine room 97. As a result, it is possible to firmly fix the first case 75 and the second case 229 with a high rigidity by share the support loads of the first case 75 and the second case 229 by the engine room 97 or the threshing device 5. In the combine harvester mentioned above, the first case 75 can be compactly assembled vertically between the front face of the cereal grain tank 7 and the back face of the driver cabin 10, and the second case 229 can be assembled in one side upper face of the threshing device 5 in adjacent to the cereal grain tank 7 with a simple supporting structure.

As shown in FIGS. 4, 6, 11 and 13, the second case 229 is supported transversely while the first case 75 is supported vertically. Therefore, in spite of the structure in which the first, case 75 can be easily installed in the narrow space (for example, between the front face of the cereal grain tank 7 and the back face of the driver cabin 10), the second case 229 and the tail pipe 83 connected to the second case 229 can be easily arranged in the upper face side of the threshing device 5 (for example, on one side upper face of the threshing device 5 which is adjacent to the cereal grain tank 7). As a result, it is possible to improve an assembling workability or a maintenance workability of the first case 75 or the second case 229. Further, it is possible to connect the vertically arranged first case 75 and the transversely arranged second case 229 by the L-shaped connection path, it is possible to easily form the L-shaped connection path by the urea mixing pipe 239, and it is possible to easily construct the urea mixing structure for jetting the urea water into the exhaust gas leading to the second case 229.

As shown in FIGS. 4, 6, 11 and 13, in the structure in which the exhaust gas inlet of the second case 229 is connected to the exhaust gas outlet of the first case 75 via the urea mixing pipe 239, and the tail pipe 83 is connected to the exhaust gas outlet of the second case 229, the urea mixing pipe 239, the second case 229 and the tail pipe 83 are connected approximately on one straight line. Therefore, in spite of the structure in which the urea mixing pipe 239, the second case 229 and the tail pipe 83 can be compactly arranged along one side corner portion in the upper face side of the threshing device 5, it is possible to improve an assembling workability or a maintenance workability of the urea mixing pipe 239, the second case 229 and the tail pipe 83.

As shown in FIGS. 4, 6, 11 and 13, in the structure in which the cereal grain tank 7 is arranged in adjacent to the threshing device 5, the driver cabin 10 is arranged in a forward side of the cereal grain tank 7, and the diesel engine 14 is arranged below the driver cabin 10, the second case 229 is provided transversely in one side upper face of the threshing device 5 which is adjacent to the cereal grain tank 7 while the first case 75 is provided vertically between the front face of the cereal grain tank 7 and the back face of the driver cabin 10. Therefore, in spite of the structure in which the first case 75 can be easily installed in the narrow space between the front face of the cereal grain tank 7 and the back face of the driver cabin 10, the second case 229 and the tail pipe 83 connected to the second case 229 can be arranged compactly along one side upper face of the threshing device 5 which is adjacent to the cereal grain tank 7, and it is possible to improve an assembling workability or a maintenance workability of the first case 75 or the second case 229.

REFERENCE SIGNS LIST

5 Threshing device
7 Cereal grain tank
10 Driver cabin
14 Diesel engine
75 First case
83 Tail pipe
97 Engine room
229 Second case
230 Second case support body
231 Second case support body
239 Urea mixing pipe

The invention claimed is:

1. An engine device of a combine harvester having a harvest storage tank positioned next to a work device for sorting/selecting harvest, a driver cabin positioned in front of the tank, and an engine room internally holding the engine, the engine room being positioned below the driver cabin, comprising:
a first case which removes particulate matter in exhaust gas of an engine and a second case which removes nitrogen oxide in the exhaust gas of the engine,
wherein the first case is affixed via a first case support body to an engine frame comprising the engine room, and the first case is provided vertically between a front face of the tank and a back face of the driver cabin,
wherein the second case is supported transversely on an upper face of the work device which is adjacent to the tank,
wherein an exhaust gas inlet of the second case is connected to an exhaust gas outlet of the first case via a urea mixing pipe, and a tail pipe is connected to an exhaust gas outlet of the second case, and
wherein a bellows-shaped connection pipe is provided between the first case and the urea mixing pipe, and the urea mixing pipe, the second case and the tail pipe are connected linearly by supporting them each with a mixing pipe supporting body, a second case supporting body and a tail pipe supporting body mounted above an upper portion of the work device which is adjacent to the engine room.

2. The engine device of a combine harvester according to claim 1,
wherein the engine room frame is comprised of upright right and left support post bodies erected on the body of the combine harvester, and a horizontal frame connecting the right and left support post bodies, and
wherein the first case is connected to the horizontal frame midway its vertical dimension via the first case supporting body.

3. The engine device of a combine harvester according to claim 1,
wherein an upper portion of the first case is positioned facing an air conditioning fan provided on the back face of the driver cabin.

* * * * *